United States Patent [19]

Stockton et al.

[11] Patent Number: 5,875,396
[45] Date of Patent: Feb. 23, 1999

[54] MULTICHANNEL RADIO FREQUENCY TRANSMISSION SYSTEM TO DELIVER WIDEBAND DIGITAL DATA INTO INDEPENDENT SECTORIZED SERVICE AREAS

[75] Inventors: G. William Stockton, Los Altos; William D. Oatman, San Jose; Brent S. Simons, Santa Clara; James H. Schoenduve, San Jose, all of Calif.

[73] Assignee: Wytec, Incorporated, Santa Clara, Calif.

[21] Appl. No.: 556,333

[22] Filed: Nov. 13, 1995

[51] Int. Cl.[6] .............................. H04N 7/173; H04B 7/00
[52] U.S. Cl. ......................... 455/562; 455/4.2; 455/422; 455/524; 370/487
[58] Field of Search .................................. 455/33.3, 33.1, 455/54.1, 56.1, 103, 5.1, 4.2, 6.1, 422, 446, 450, 500, 507, 517, 524, 526, 560, 561, 562, 4.1; 348/6, 7, 12, 13; 375/260; 370/326, 329, 336, 339, 487

[56] References Cited

U.S. PATENT DOCUMENTS

| | | | |
|---|---|---|---|
| 4,302,771 | 11/1981 | Gargini | 455/6.1 |
| 4,567,602 | 1/1986 | Kato et al. | |
| 4,639,914 | 1/1987 | Winters | 455/33.3 |
| 4,694,484 | 9/1987 | Atkinson et al. | 455/33.3 |
| 4,747,160 | 5/1988 | Bossard | 455/33.3 |
| 4,750,036 | 6/1988 | Martinez | 348/12 |
| 4,788,675 | 11/1988 | Jones et al. | 370/487 |
| 4,829,372 | 5/1989 | McCalley et al. | 348/7 |

(List continued on next page.)

FOREIGN PATENT DOCUMENTS

1333089  3/1988  Canada .

OTHER PUBLICATIONS

Pilgrim, et al., "Wave Direct-to-Home Multichannel TV Delivery System," 1989 IEEE Federal Communications Commission, Xerox Corporation Peition for Rule Making, pp. 1–40 (1978).

Vogelman, Dr. Joseph H., "Application of Millimeter Microwaves for the Transmission of a Multiplicity of Television Bandwidth Communication Signals on a Single Carrier" in *Proceedings of the 1971 European Microwave Conference*, vol. 2, pp. C11/2:1–2:4, The Royal Swedish Academy of Engineering Sciences (1971).

*Primary Examiner*—Reinhard J. Eisenzopf
*Assistant Examiner*—Lester G. Kincaid
*Attorney, Agent, or Firm*—Burns, Doane, Swecker & Mathis LLP

[57] ABSTRACT

A one-way and two-way multichannel radio frequency transmission system and method employing a sectorized broadcasting technique is described. The system and method reduces the effective bandwidth of the broadcast signal by multiplexing available channels of signals into a set of formatted independent digital bitstreams—where each of the bitstreams includes all or a portion of the available channels provided by the system program provider. The independent bitstreams are transmitted to transmitting towers using point-to-point transmission methods. The transmitting towers phase modulate and amplify the bitstreams to generate a set of independent modulated signals. Each transmitter tower includes an antenna for broadcasting the modulated signals to a sectorized service area—each sector in the service area receiving a different one of the set of independent modulated signals. The antenna includes a set of individual antenna panels—each panel for broadcasting one of the set of modulated signals. Each subscriber site demodulates, demultiplexes and selects one channel from the received modulated signal. Each transmitting tower broadcasts all of the independent modulated signals at one of a set of operating frequencies such that adjacent transmitting towers broadcast at different operating frequencies. In addition, adjacent antenna panels of a given antenna transmit at opposite transmission polarity.

38 Claims, 20 Drawing Sheets

U.S. PATENT DOCUMENTS

| | | | |
|---|---|---|---|
| 5,027,400 | 6/1991 | Baji et al. | 455/5.1 |
| 5,193,109 | 3/1993 | Lee . | |
| 5,260,673 | 11/1993 | Pham . | |
| 5,339,315 | 8/1994 | Maeda et al. | 455/4.2 |
| 5,406,558 | 4/1995 | Rovira et al. | 370/326 |
| 5,548,813 | 8/1996 | Charas et al. | 455/33.3 |
| 5,553,069 | 9/1996 | Ueno et al. | 370/329 |
| 5,592,490 | 1/1997 | Barratt et al. | 370/329 |

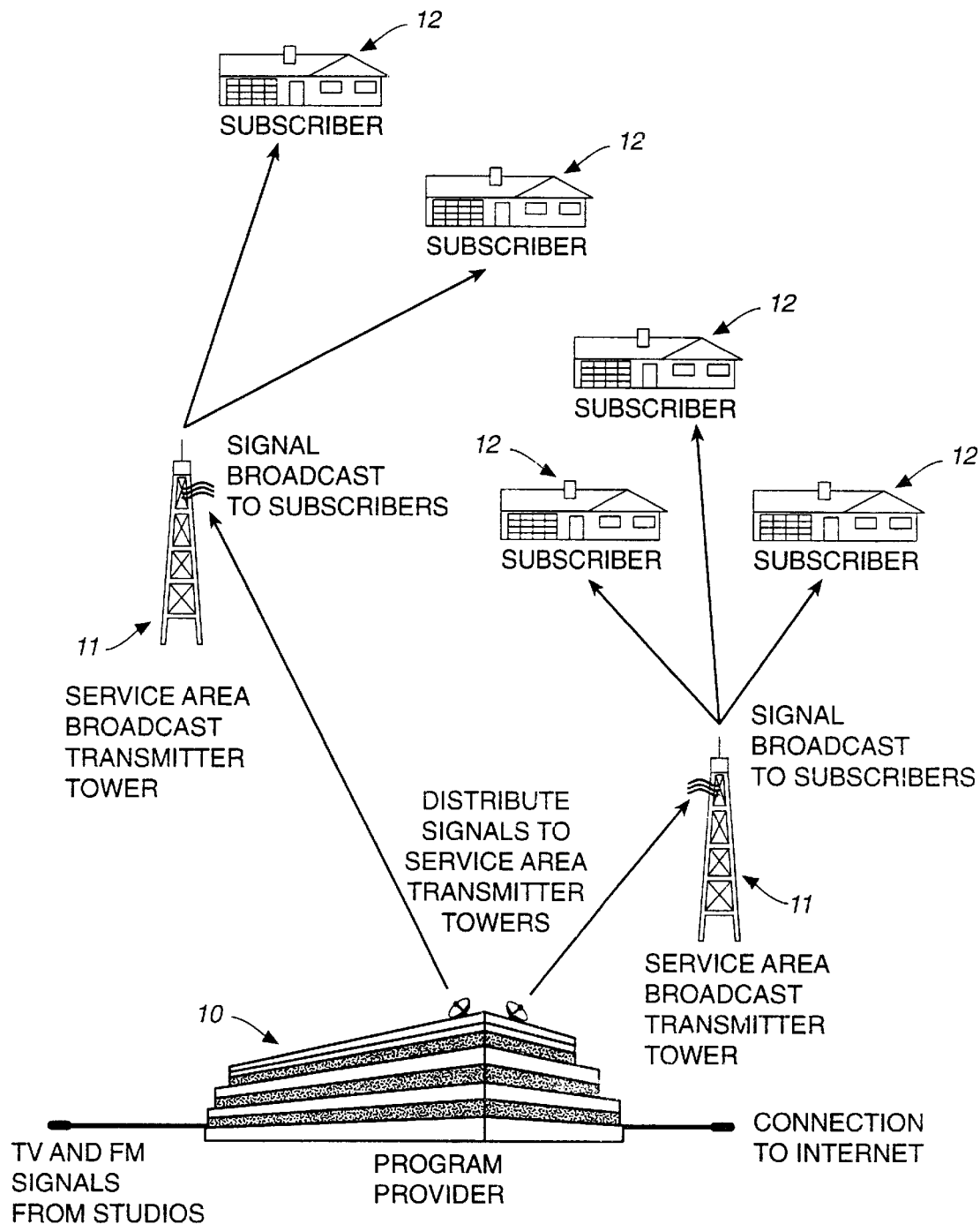
FIG._1

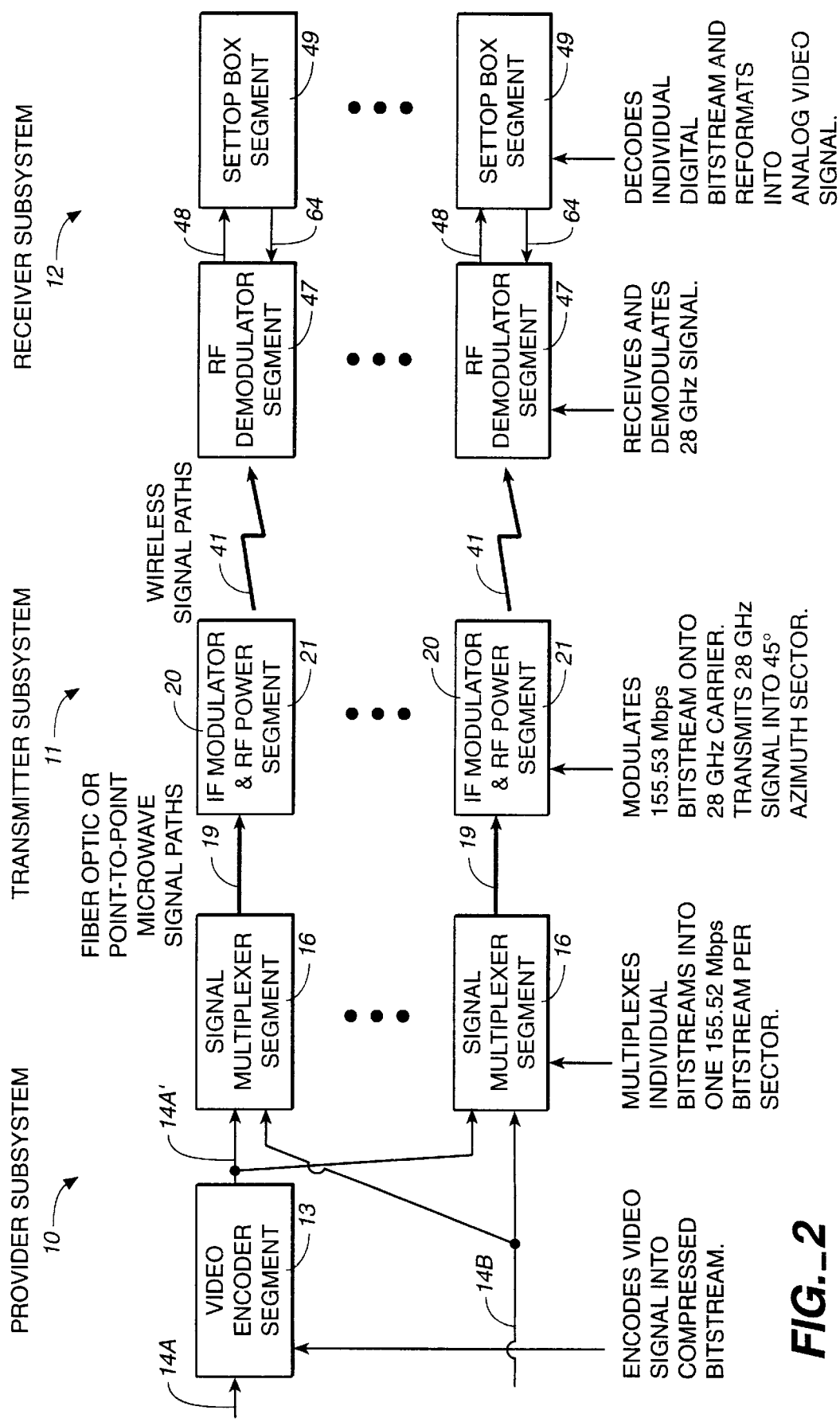
FIG._2

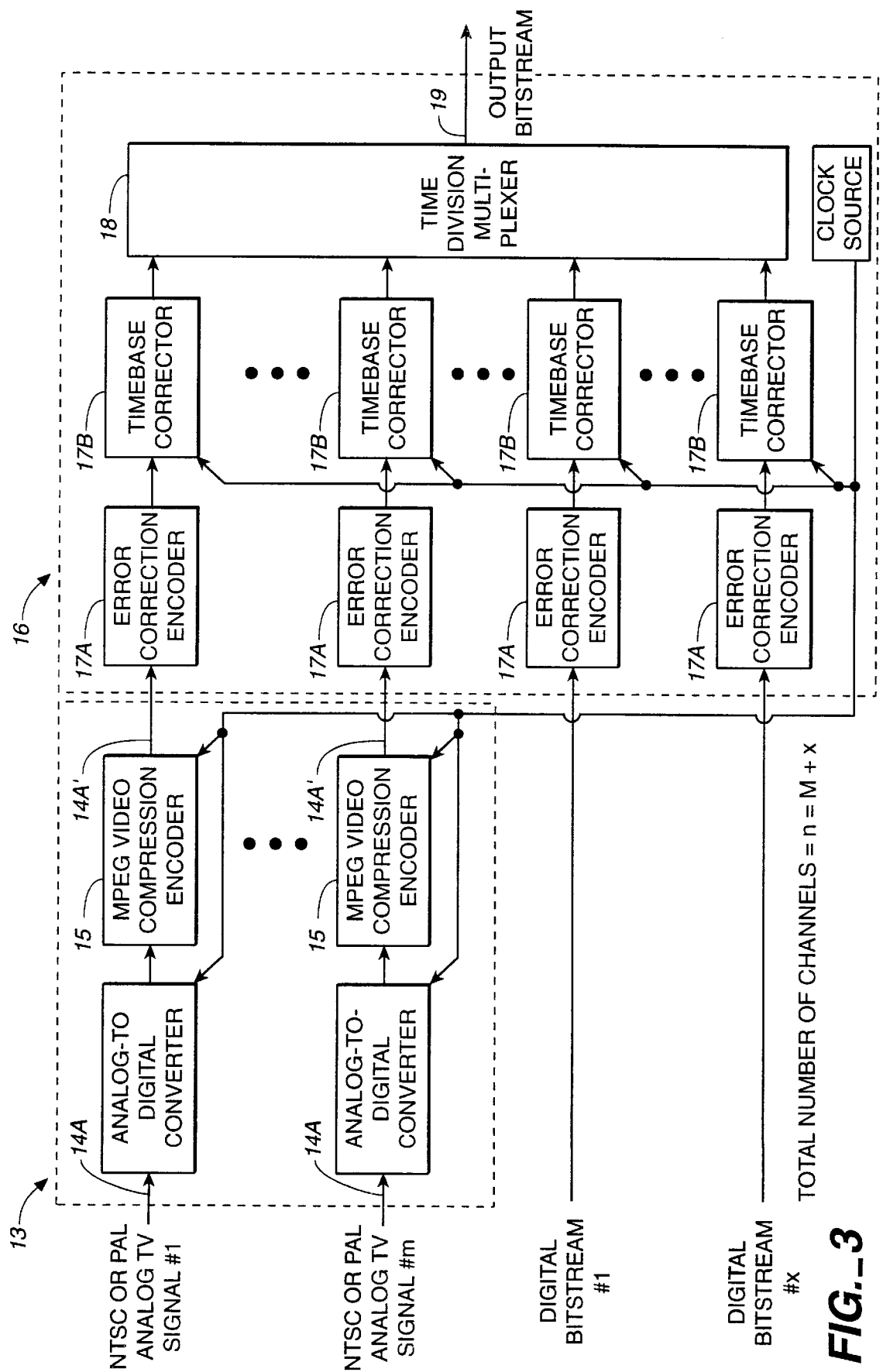
FIG._3

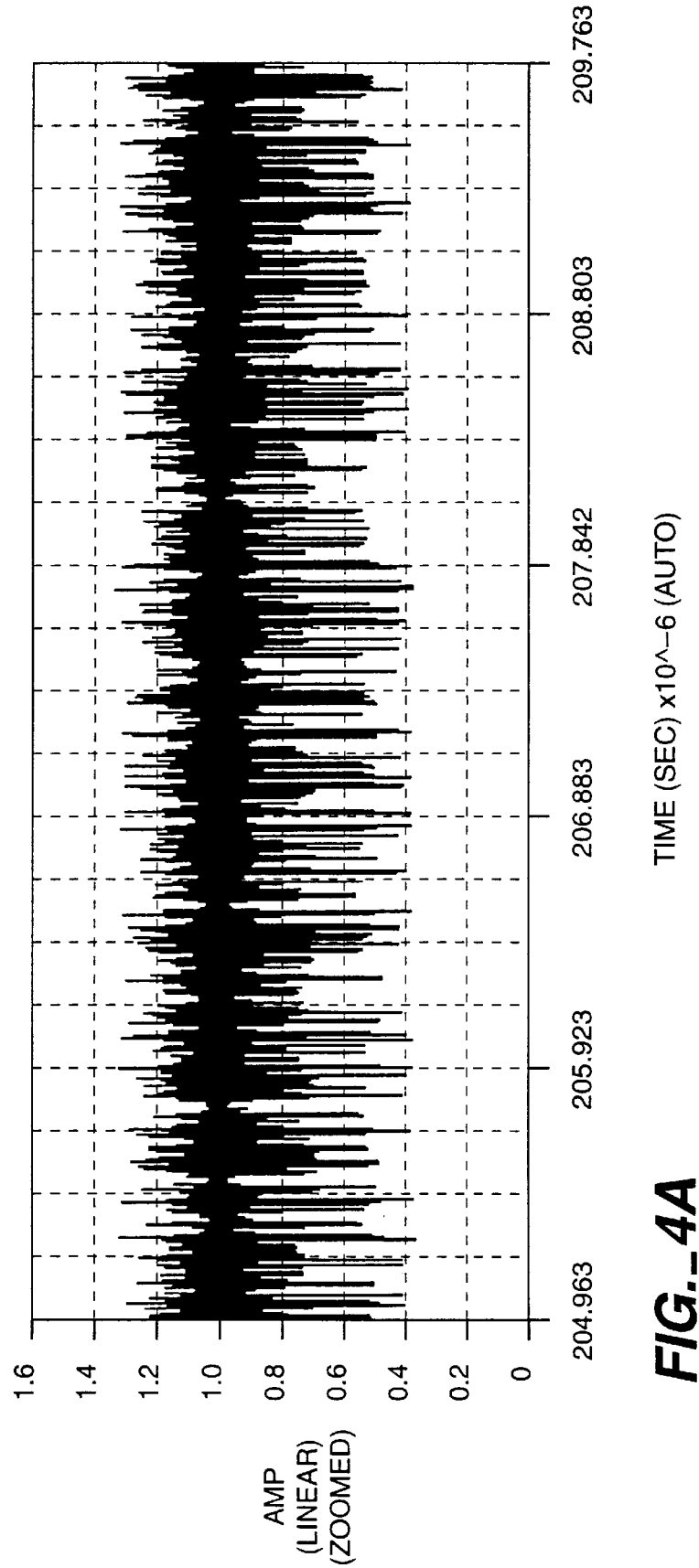
FIG._4A

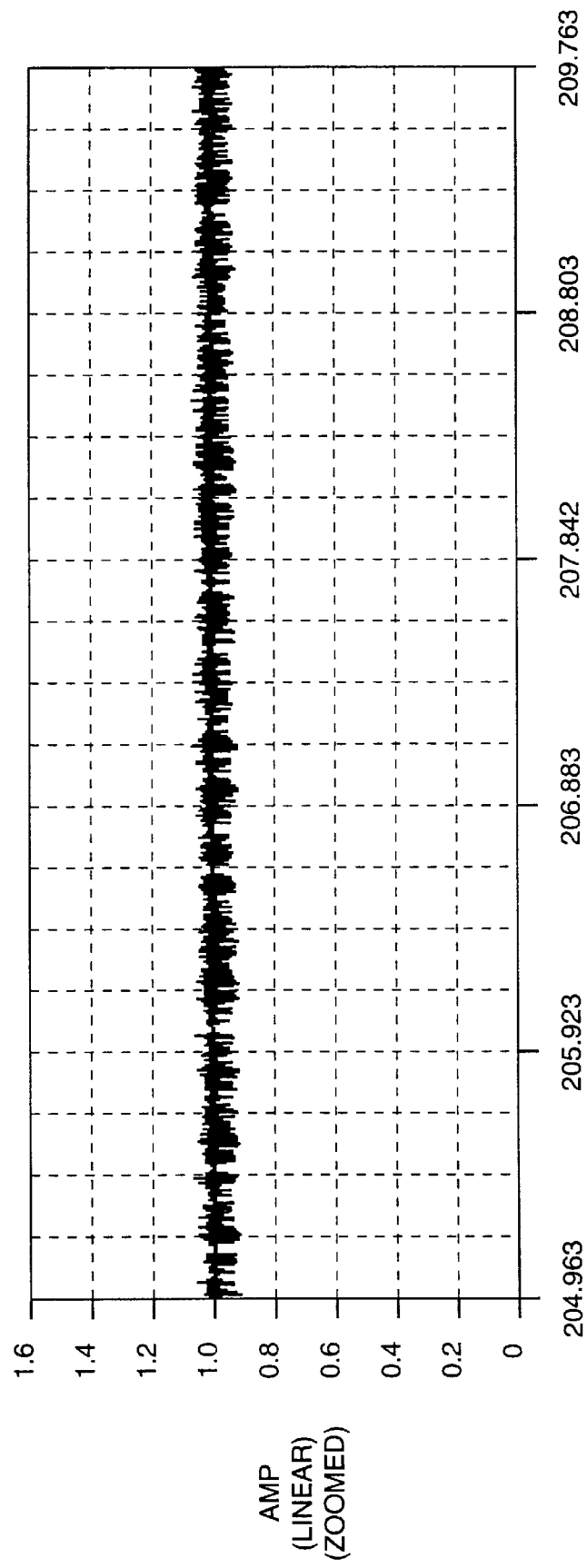
FIG._4B

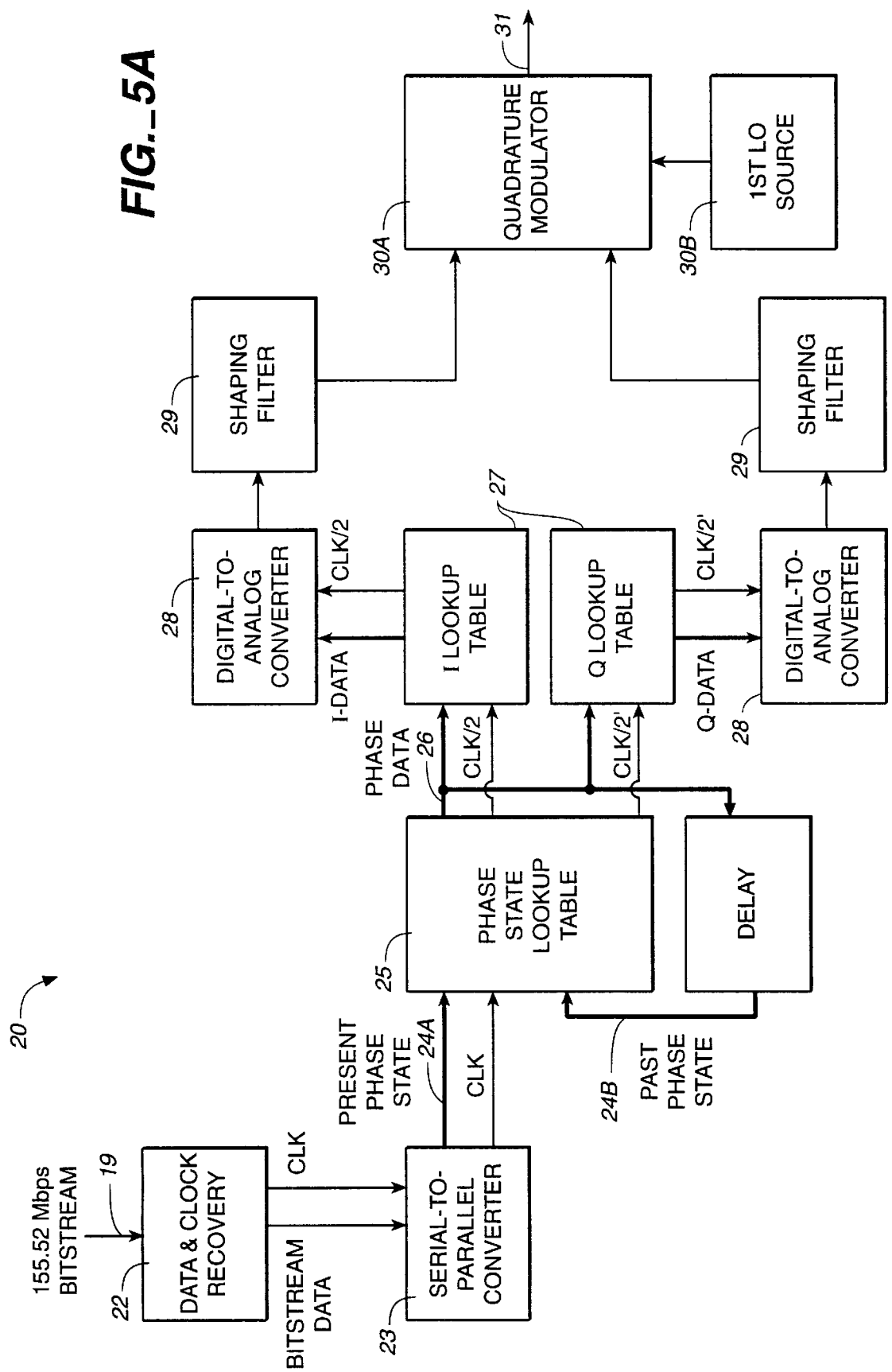
FIG._5A

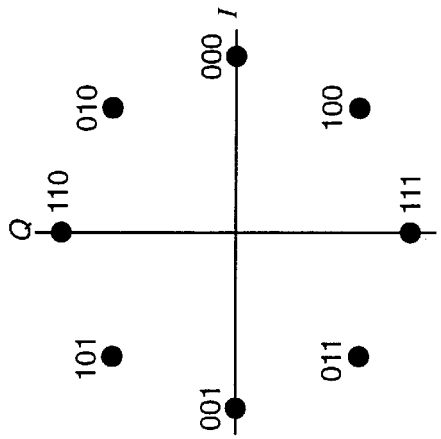
FIG._5C
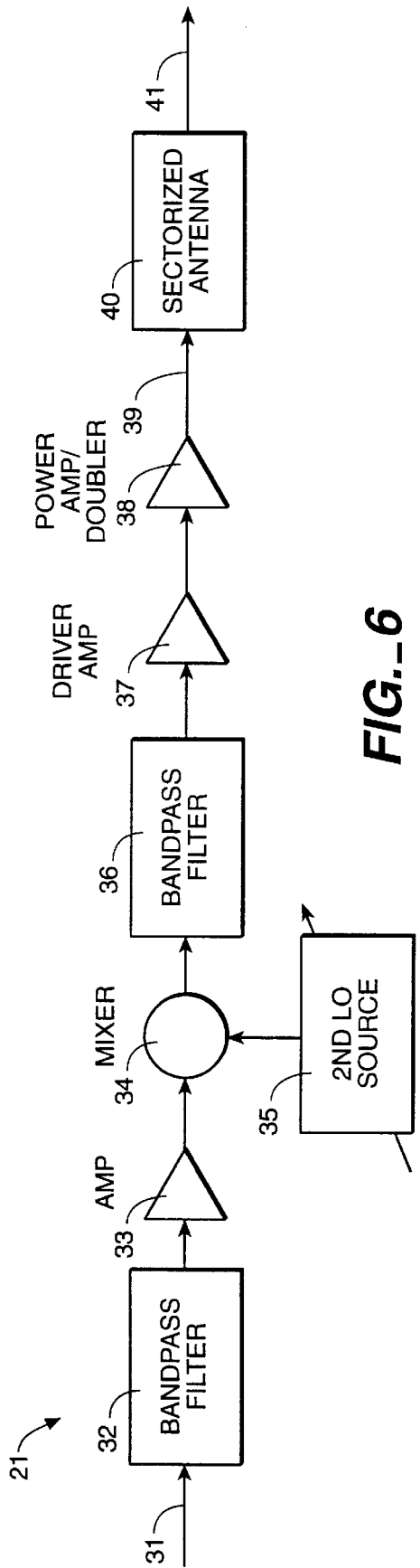
FIG._5B
XXX - STATE NOT ALLOWED.
FIG._6

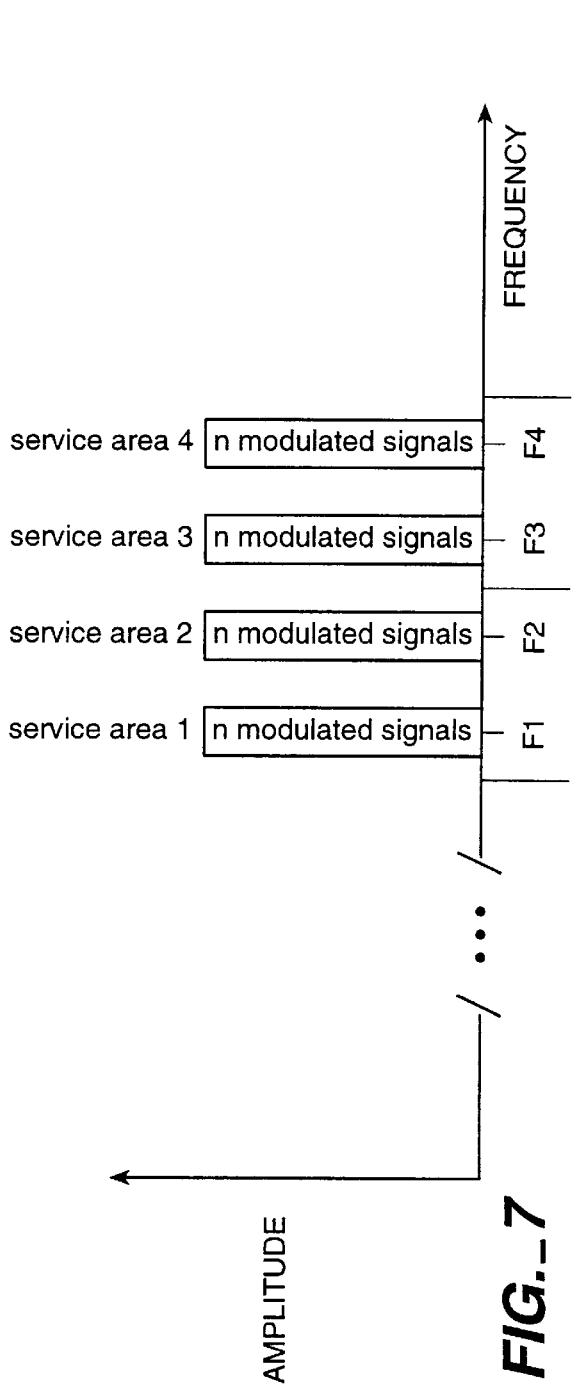
FIG._7
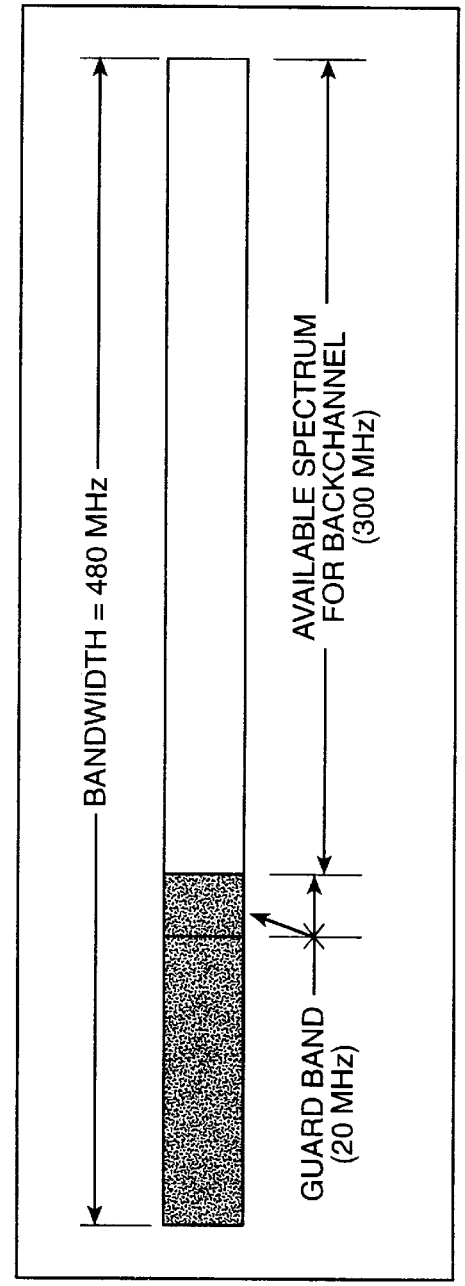
FIG._13

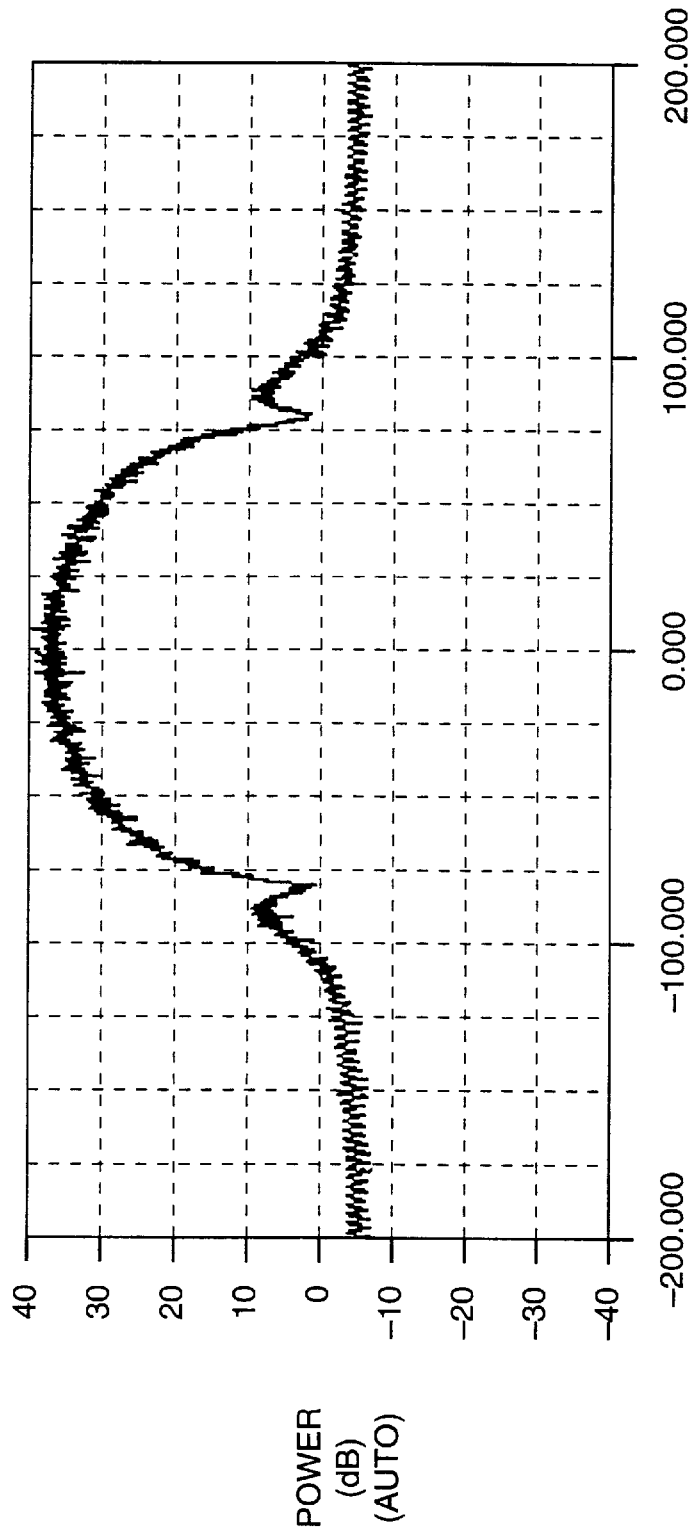
FIG._8A

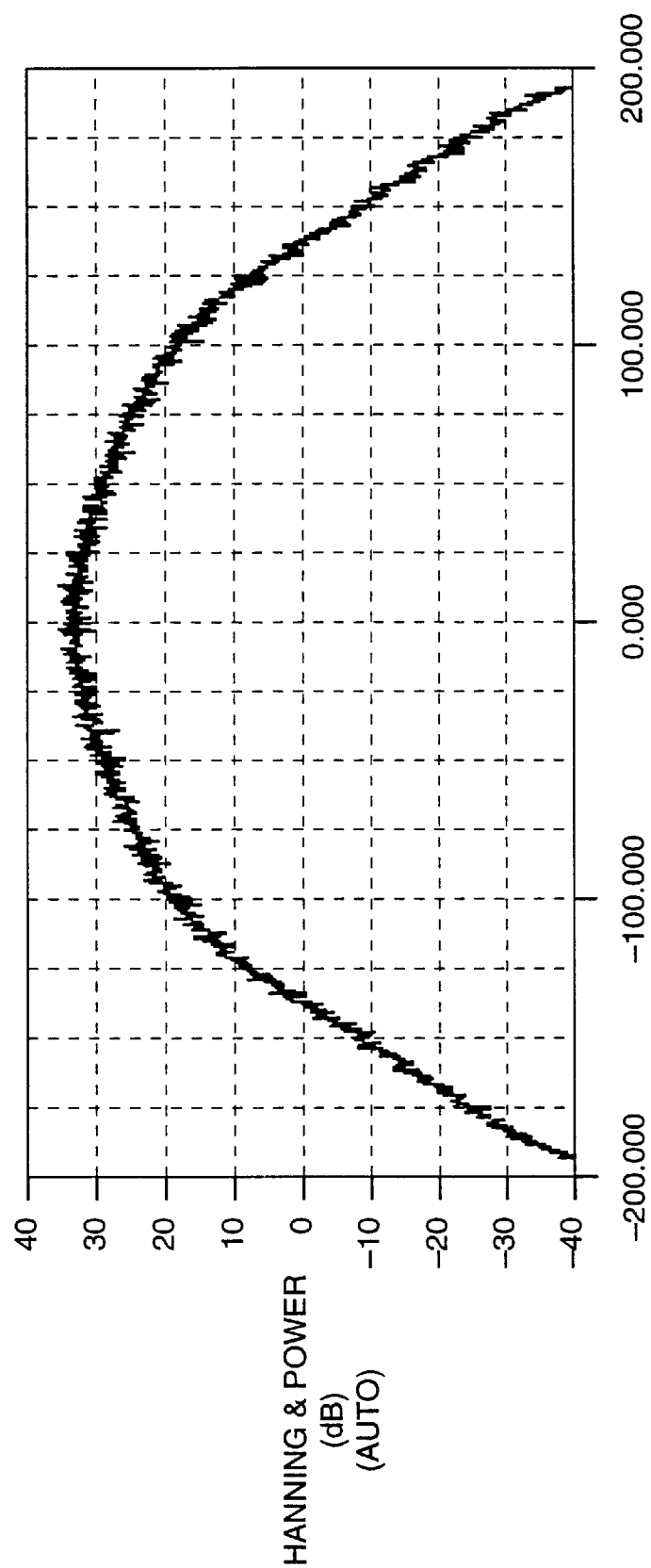
FIG._8B

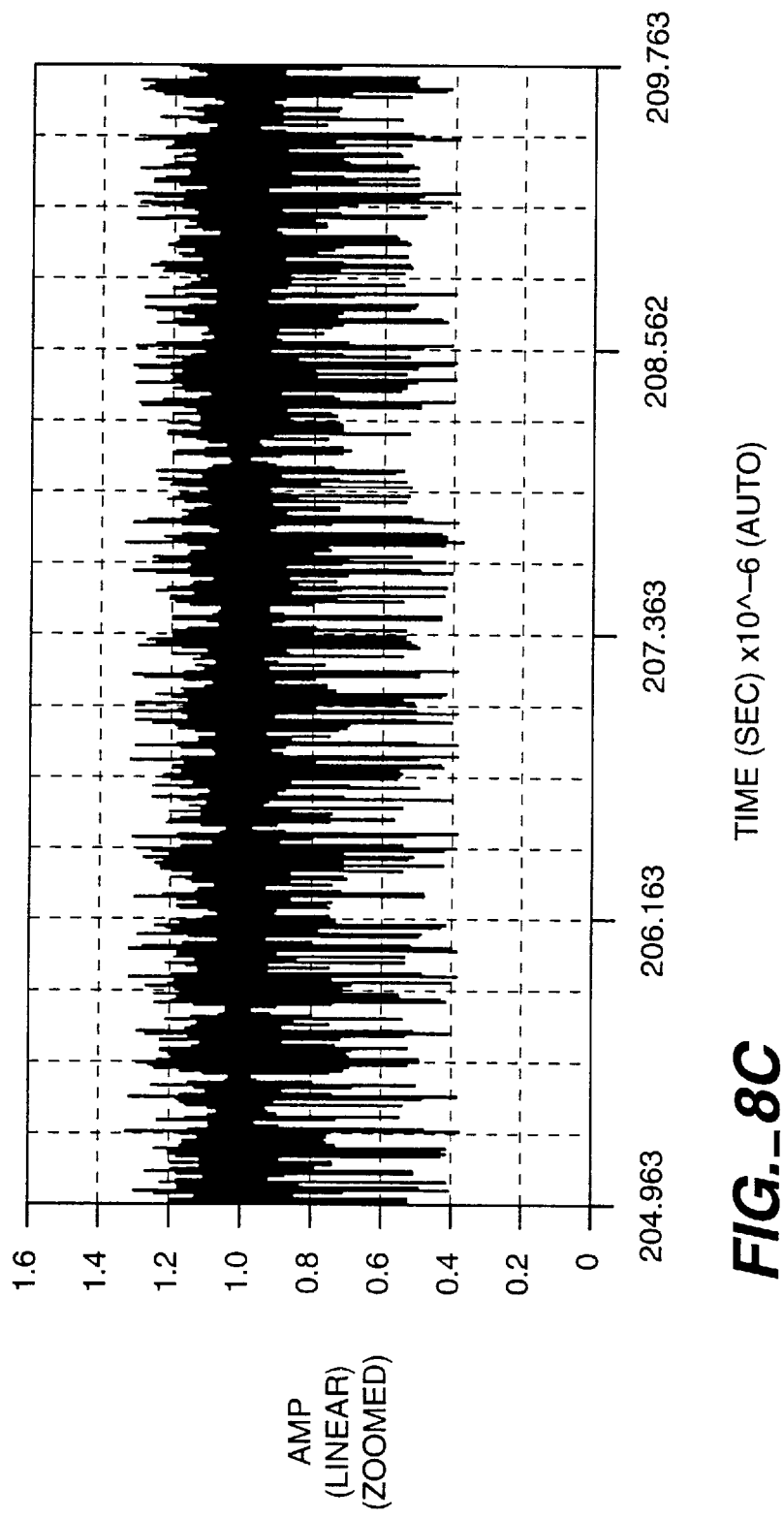
FIG._8C

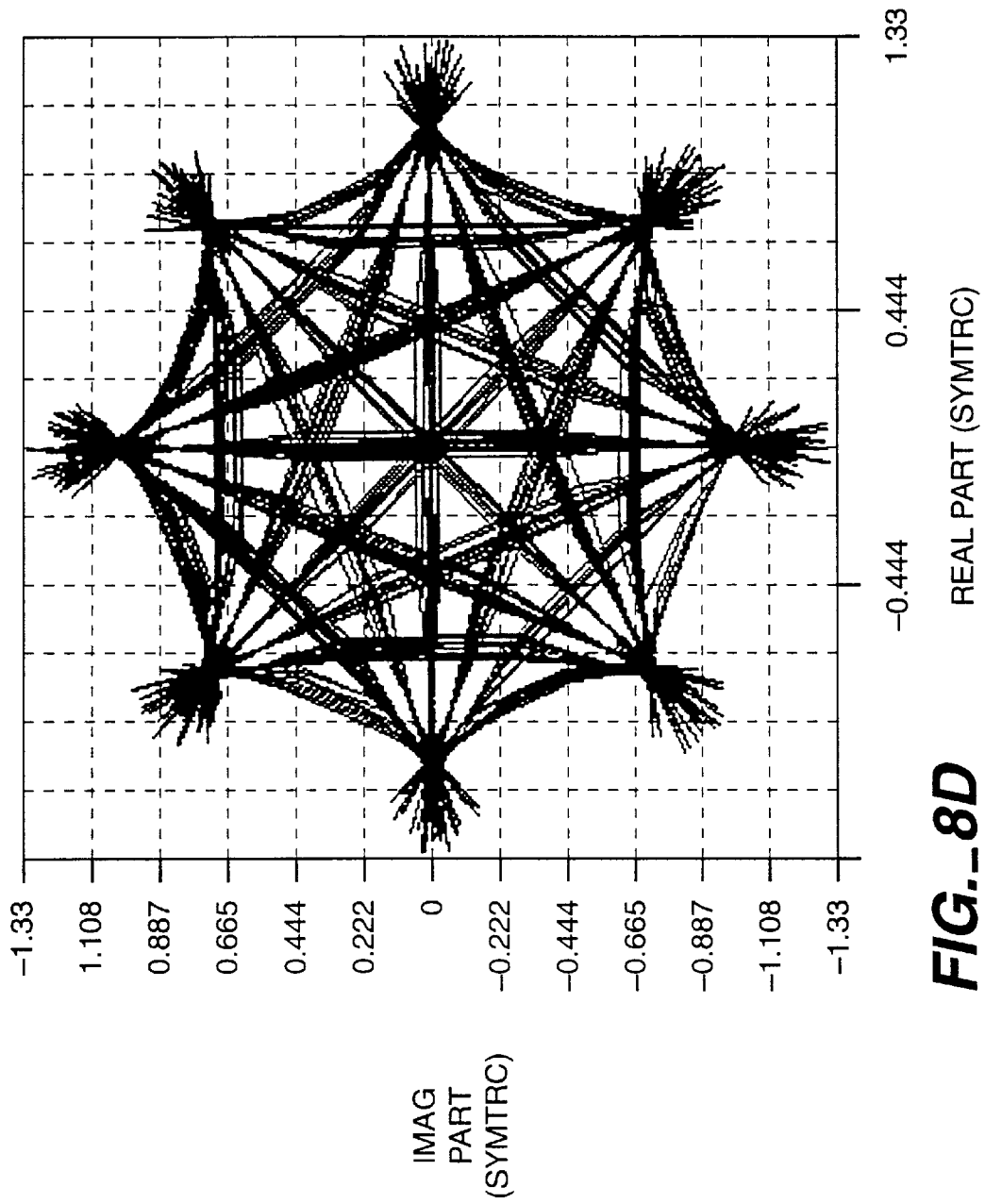
FIG._8D

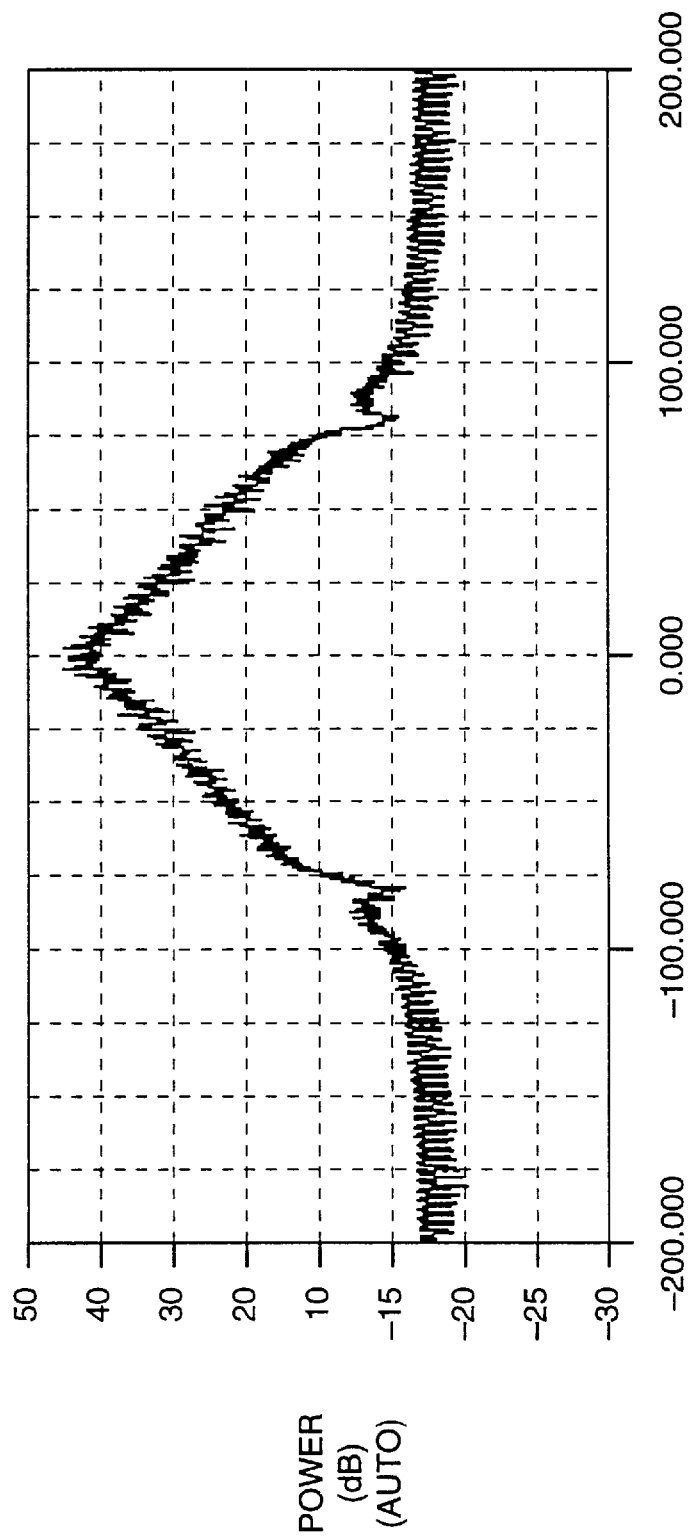
FIG._9A

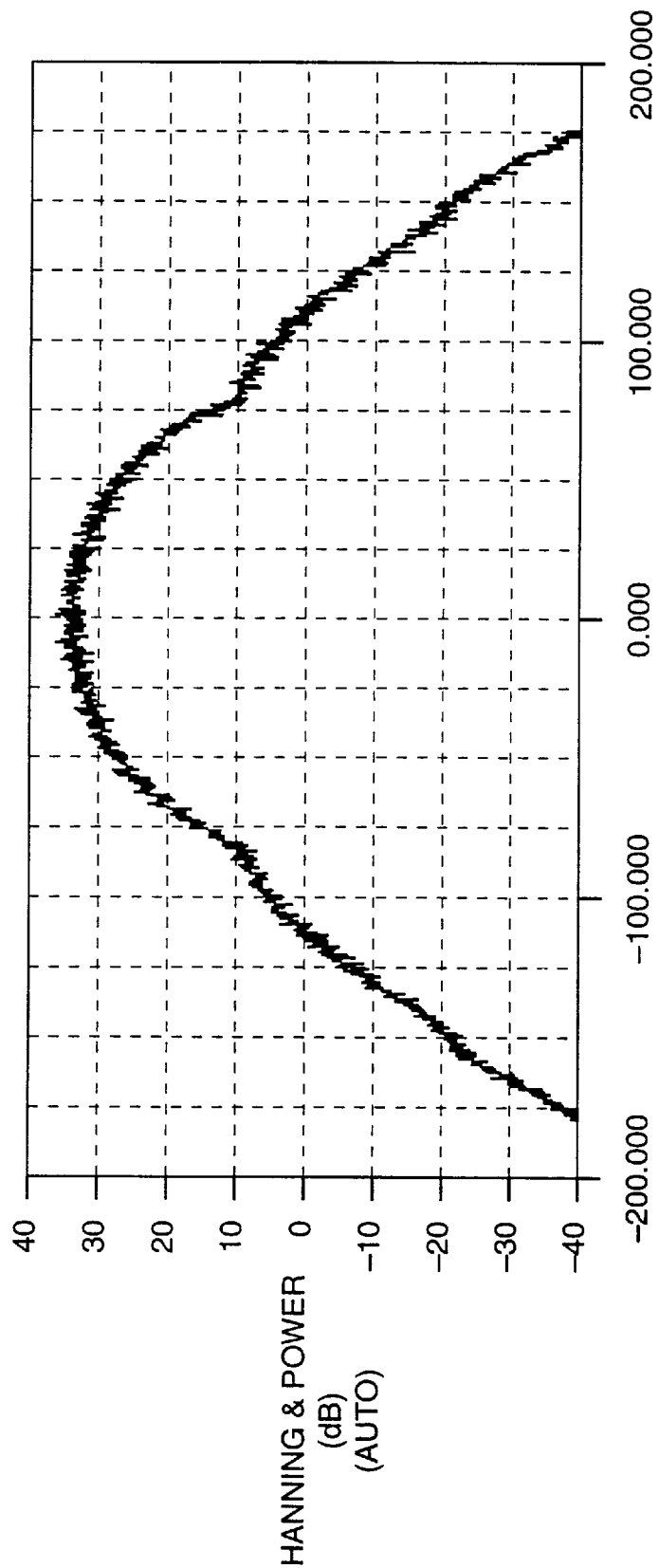
FIG._9B

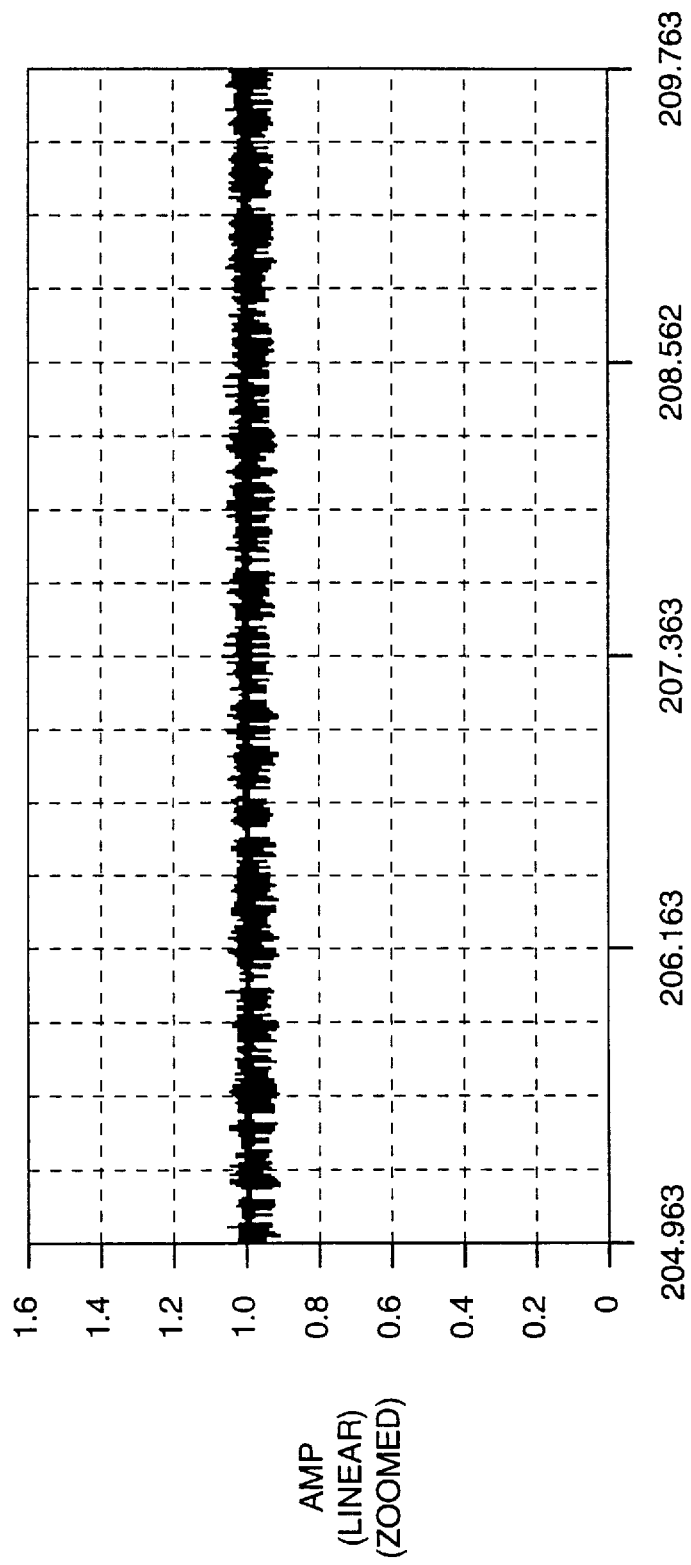
FIG._9C

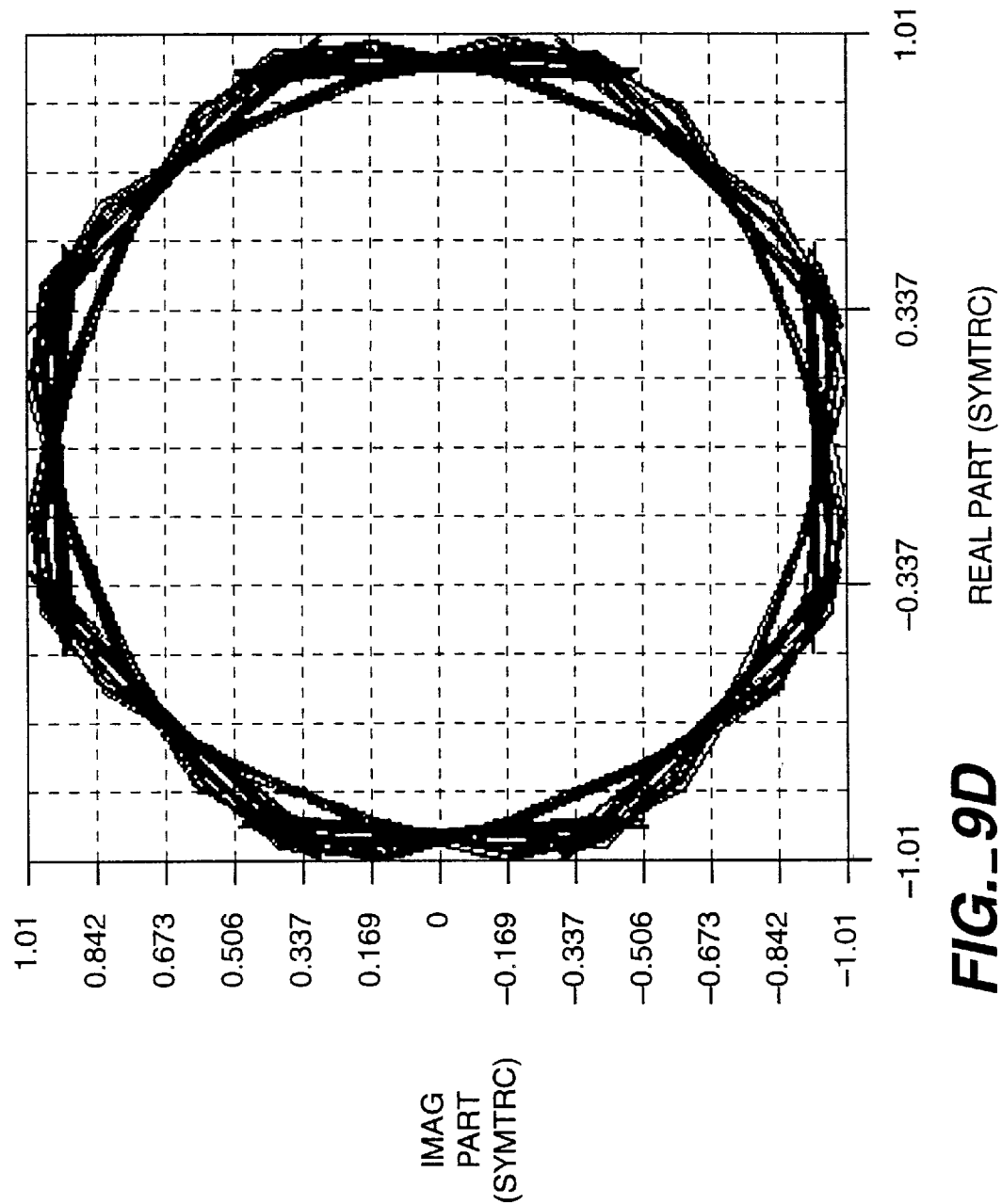
FIG._9D

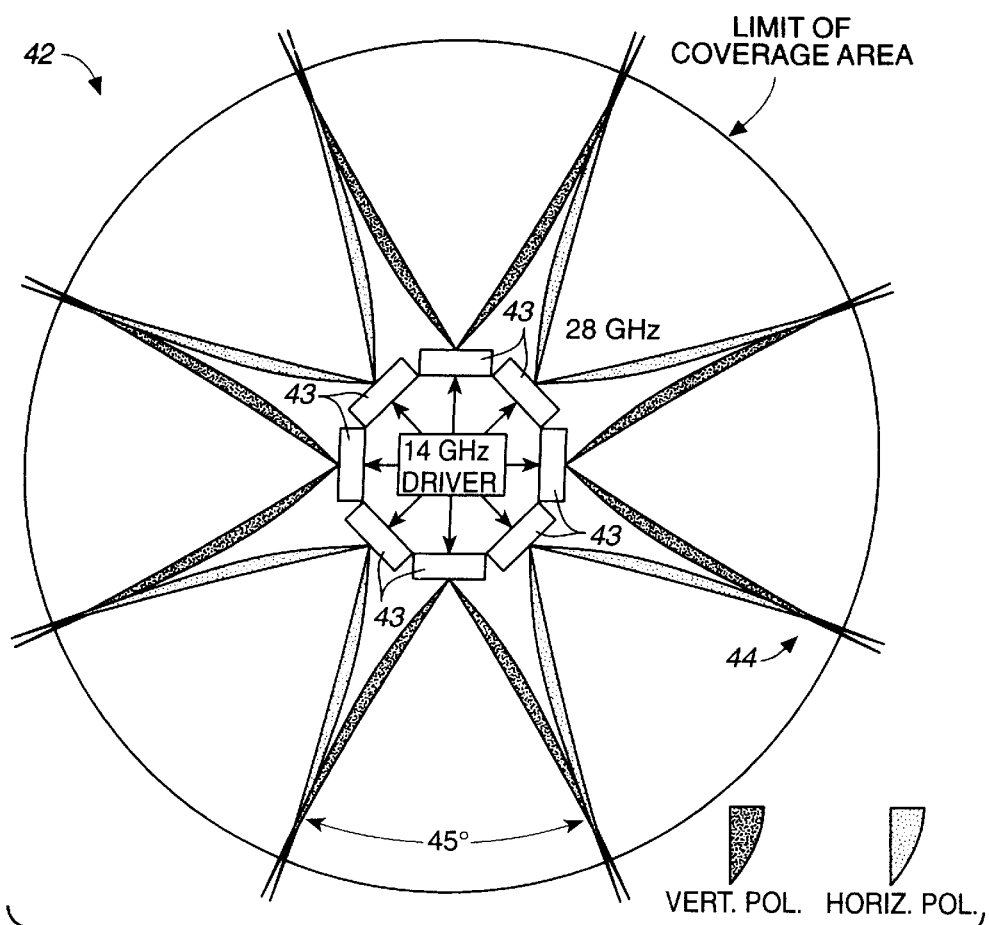
FIG._10A
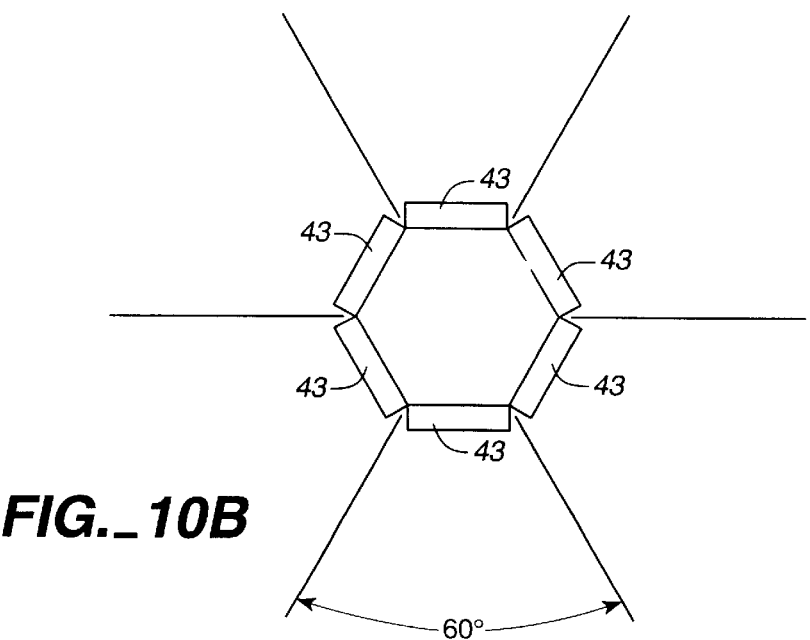
FIG._10B

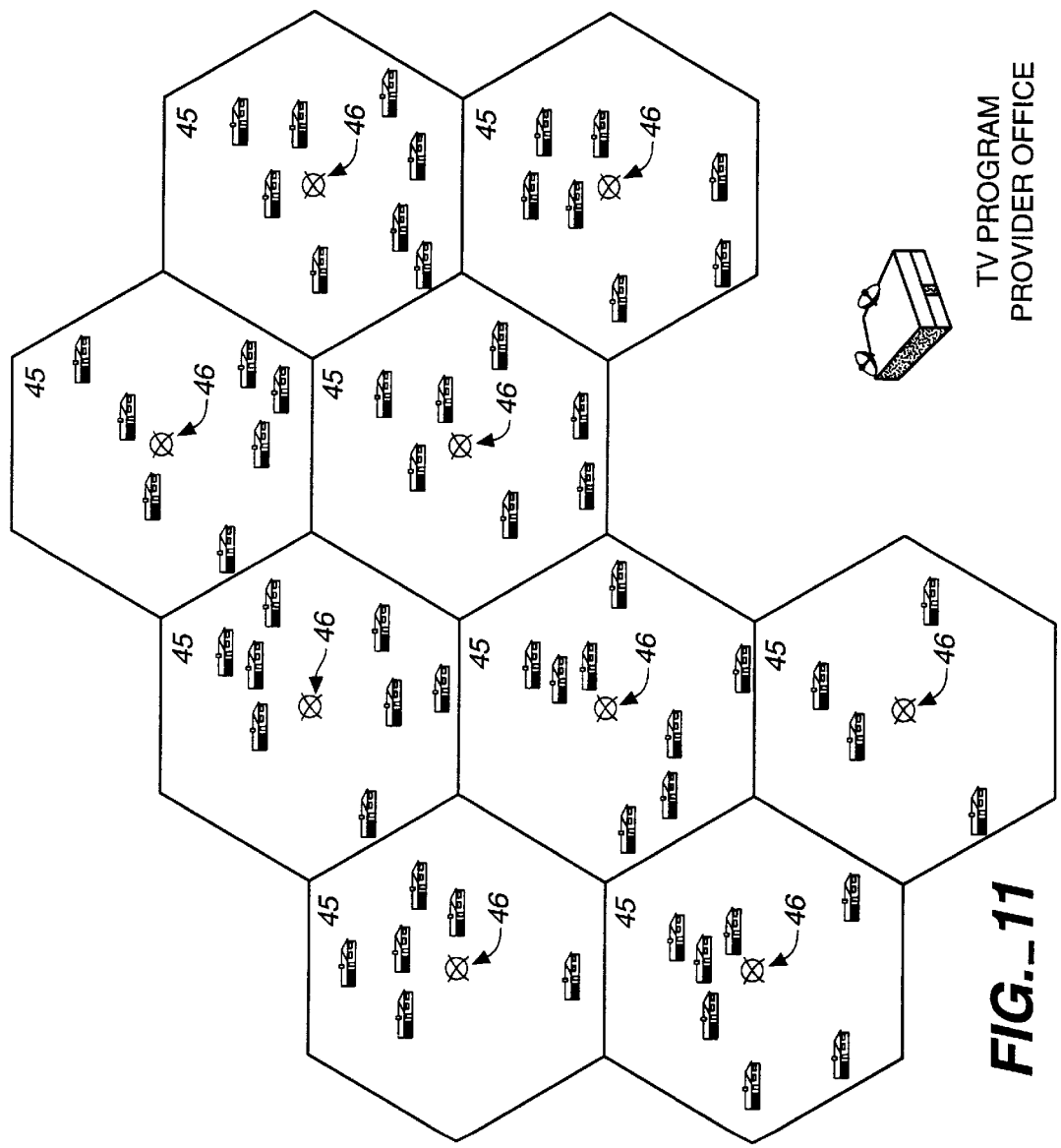
FIG._11

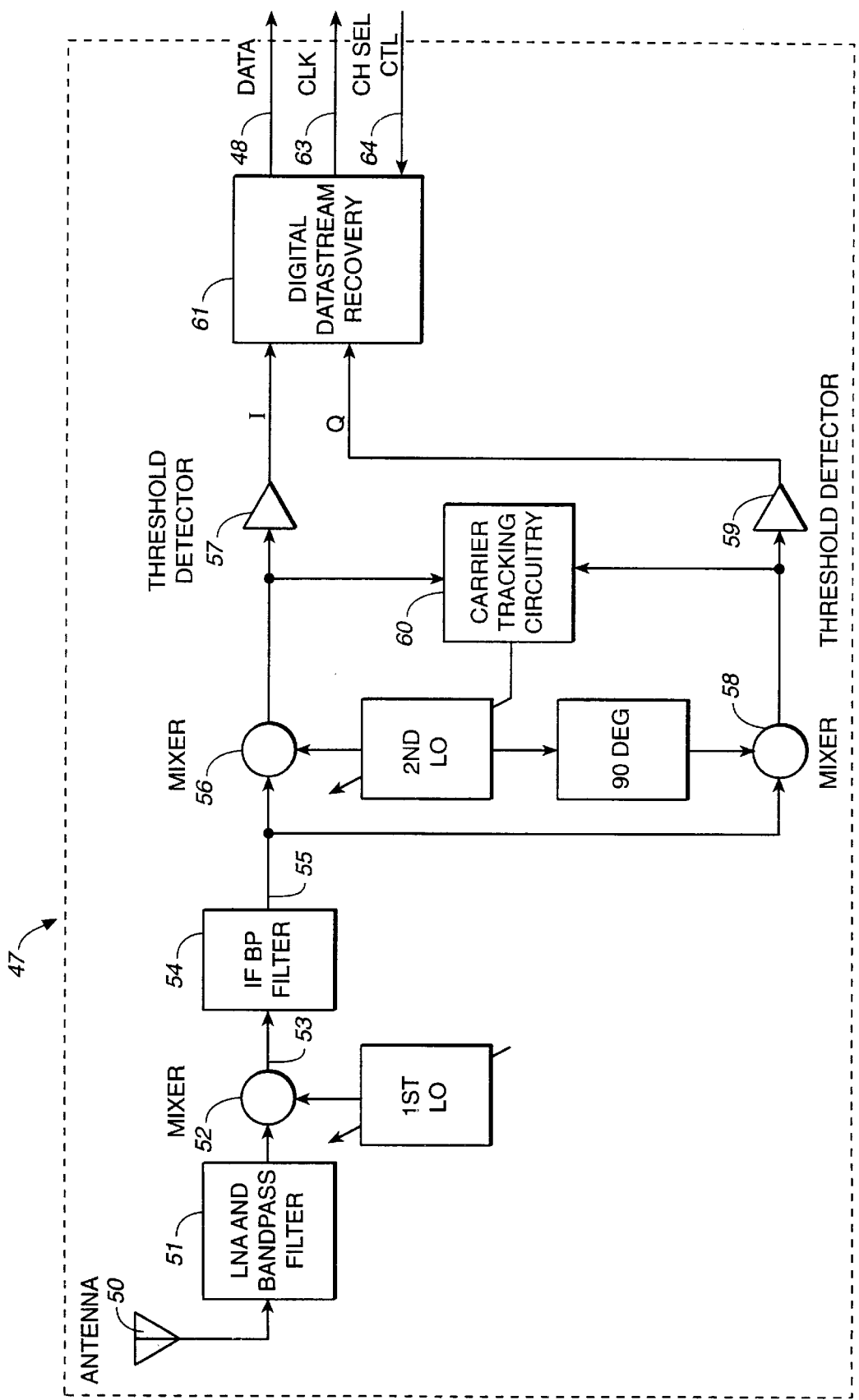
FIG._12A

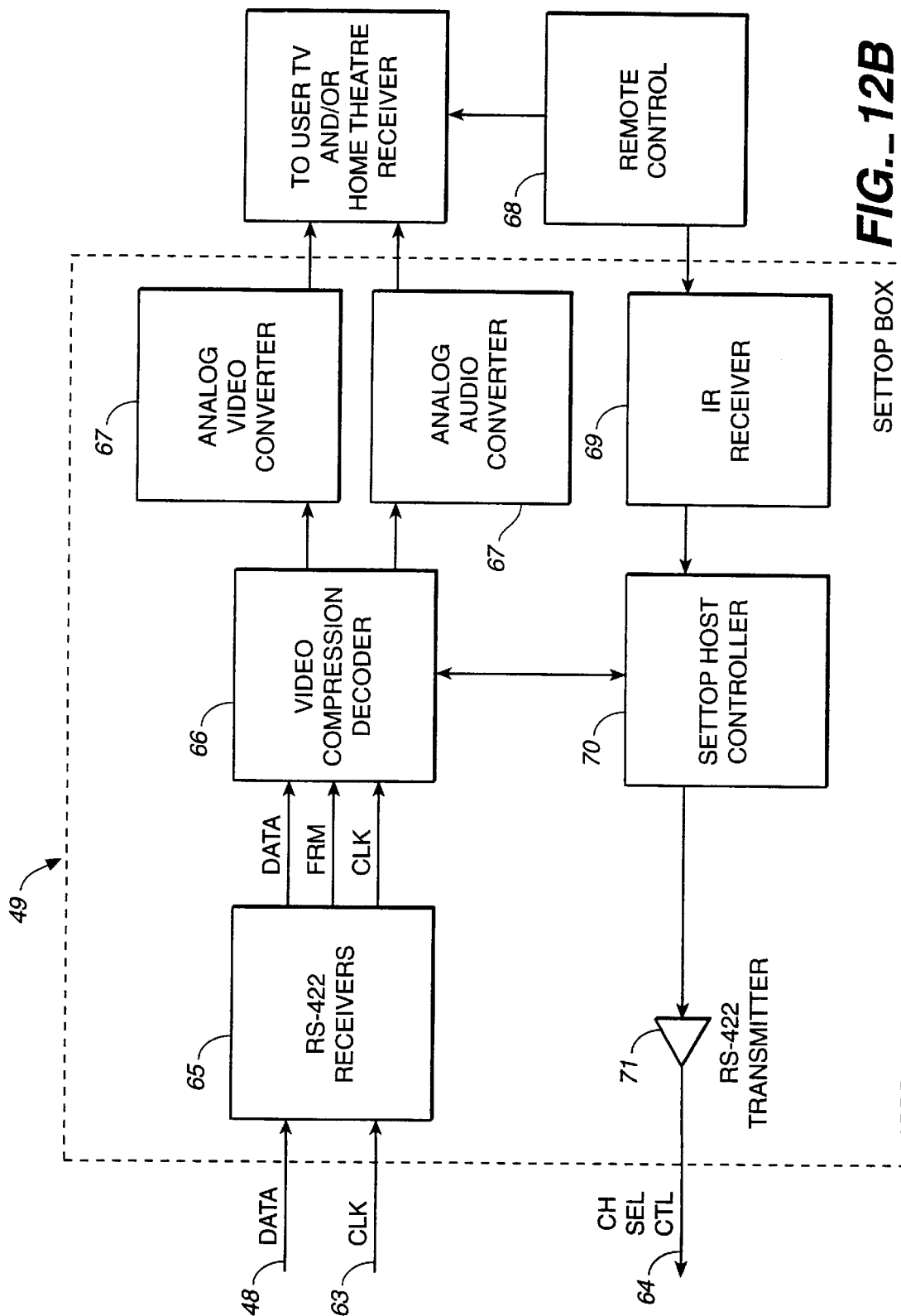

MULTICHANNEL RADIO FREQUENCY TRANSMISSION SYSTEM TO DELIVER WIDEBAND DIGITAL DATA INTO INDEPENDENT SECTORIZED SERVICE AREAS

FIELD OF THE INVENTION

The present invention relates to a multichannel data distribution system using radio frequency (RF) transmission links, and more particularly to a digitally-implemented RF transmission system for use in one-way or two-way multichannel data distribution applications such as video conferencing, video on demand, wireless cable television, and other digital data transmission activities.

BACKGROUND OF THE INVENTION

A variety of multichannel RF signal distribution systems currently are being employed to deliver commercial broadcast television programming to residential customers. These RF transmission systems often are called "wireless cable" television systems, because they can provide multichannel entertainment programming identical to conventional cable television services, but without the cost and disruption incurred in installing video cable between the program provider's studio and each customer's residence.

United States electronic equipment suppliers have manufactured RF transmission systems to provide Multichannel Multipoint Distribution Service (MMDS) as authorized by the United States Federal Regulations Title 47 (Telecommunication). These MMDS systems have been installed in major metropolitan areas and are used by the television entertainment industry to augment conventional television broadcasts by transmitting premium videos to residential subscribers on a fee (pay-per-view) basis. MMDS uses allocated spectrum at various frequencies in the 2.1 to 2.7 GHz band to transmit fourteen independent channels of video. The MMDS transmitters are installed at locations authorized by the United States Federal Communications Commission (FCC). Each of these transmitter locations has been selected so that it can broadcast into the surrounding service area without creating interference in the adjacent service areas.

In responding to the need for additional wireless multipoint television distribution spectrum (i.e. in addition to the authorized MMDS spectrum), the FCC issued an interim operating license in the 27.5 to 29.5 GHz band. The technology employed for use of this spectrum has been designated Local Multipoint Distribution Service (LMDS) and one implementation of a LMDS is disclosed in U.S. patent application Ser. No. 4,747,160. Both LMDS and its predecessor MMDS broadcast multichannel television signals into specified "service areas". Service areas (also referred to as "cells") identify non-overlapping geographic regions that receive interference-free transmission from separate transmitter sites.

Another prior art television broadcast technology similar to LMDS is designated Millimeter-wave Multichannel Multipoint Video Distribution Service ($M^3VDS$) and is described in detail in 1989 IEEE MTT (pages 1095–1102).

Because all of these systems have similar configurations and because they employ related technologies, it is useful to regard these wireless multichannel television RF broadcast systems as implementations of the same system concept. Henceforth, these systems (i.e. MMDS, LMDS, $M^3VDS$, and any similar system) will be referred to as multipoint distribution systems (MDS).

Referring to FIG. 1, an MDS typically includes a program provider site 10, a plurality of service area broadcast transmitter towers 11, and a plurality of subscribers 12 in each service area. The program provider distributes multiple channels of signals (via satellite, cable, point-to-point microwave transmission, or fiber optics or any other transmission medium) to each of the service area transmitter towers. Each tower, in turn, broadcasts via RF transmission the received signals (commonly analog signals) to a plurality of subscribers residing in the vicinity surrounding each given tower (i.e., the service area). The range of signal transmission for a given tower (and consequently the size of the service area) is primarily dependent on the power characteristics of the signal being transmitted by the given tower. Each subscriber within a given service area uses an antenna and receiver unit coupled to a television to receive and view the television signals broadcast from the transmitter tower within the given service area. Selection of the desired television channel and adjustment of the audio and video parameters is performed at the television set in the subscriber site by means of controls located on the television or by a remote control unit.

Presently, MDS systems transmit multiple channels of television signals from the service area broadcast towers in parallel. In other words, each distinct television channel (having a given modulation bandwidth) is individually and simultaneously transmitted. Thus, the total bandwidth of the broadcast signal is equal to the sum of the modulation bandwidths of each of these channels plus any additional spectrum used as spacing between the channels to minimize mutual interference.

As an example of this spectrum utilization, MMDS television broadcast systems in the United States employ amplitude modulation (AM) methods which require 6 MHz of bandwidth for each television channel. Up to fourteen of these 6 MHz channels are broadcast by MMDS systems. In contrast, LMDS television broadcast systems in the United States currently employ frequency modulation (FM) methods which require 20 MHz of bandwidth for each television channel. The LMDS system employs 1 GHz of spectrum which enables it to broadcast up to fifty of the 20 MHz wide channels. In the United Kingdom, the $M^3VDS$ television broadcast system employs FM methods which require 38 MHz of bandwidth for each channel. Consequently, the $M^3VDS$ system required 304 MHz of spectrum to broadcast the eight television channels initially specified by the British television broadcast authorities.

The modulation methods employed in the above prior art MDS systems completely consume the available spectrum while broadcasting conventional television programming. However, the current trend in cable television technology is to install additional channels so that special video can be provided to interested subscribers. Potentially, these additional channels would be used in special applications such as video-on-demand and video conferencing for selected subscribers. In addition, these channels might be used for computer and data retrieval tasks, for access to the Internet and other data bases, and for interactive applications such as video games and home shopping. These special applications which are targeted at individual subscribers are sometimes designated "narrowcasts" to differentiate them from the usual entertainment television programming that is "broadcast" to all subscribers. Narrowcasting requires many individual and independent channels so that many individual subscribers can be served simultaneously.

Another drawback of presently implemented MDS systems results from signal interaction between adjacent service areas. Specifically, subscribers in vicinities residing along the boundary of a service area may receive signals from the desired service area transmitter tower and also from one or more adjacent service area transmitter towers. These multiple signals entering the subscriber receiver equipment often result in significant degradation of the desired signal quality. Thus, one important design consideration of an MDS transmission system is to ensure that each subscriber receives a strong interference-free signal.

One prior art MDS system designed to avoid mutual interference problems among adjacent service areas (disclosed in U.S. Pat. No. 4,747,160) employs omnidirectional polarized antennas, each antenna broadcasting into a circular service area. Each antenna transmits signals having either a horizontal or vertical polarity. Subscribers in this prior art system use directional antennas that are tuned to a given transmission polarity and physically aimed towards a transmitter tower having the corresponding polarity. As a result, interference from an adjacent transmitter tower is eliminated if the adjacent tower is transmitting a cross-polarized signal. However, the problem with this transmission scheme is that only two polarizations are available, but there exist some subscriber locations which will be illuminated by transmissions from three or more towers. At least one of these additional interfering signals will be of the same polarity as the subscriber's antenna. Consequently, at least one interfering signal may enter the subscriber's antenna along with the desired signal, and the quality of the desired signal may be degraded substantially.

The present invention is a digitally implemented multi-channel data distribution system and method that overcomes the above described problems. Specifically, the system of the present invention employs digital signal processing techniques to combine the analog television channel signals (i.e., the audio and video signal components) and other channel signal types (such as digital television signals, teleconferencing signals, interactive programming signals, computer data signals, and video-on-demand signals) into a single stream of formatted data. Then, the system of the present invention uses special modulation methods to reduce the effective spectrum bandwidth of the transmitted signal. As a result, the present invention is able to fit many more independent channels into an authorized operating spectrum bandwidth than can the prior art transmission systems thereby overcoming the prior art limitation of obtaining many individual and independent channels required to implement narrowcasting.

The system and method of the present invention also employs a multifaced sectorized antenna at each of the transmitter sites 11. The sectorized antenna, comprised of a plurality of independent smaller antennas, essentially divides each service area into a plurality of independent wedge-shaped azimuthal sectors. For each azimuthal sector, independent channel signals and other data are received from the provider studio as a single digital data stream which is modulated, amplified, and transmitted to the appropriate subscribers residing in that specific sector. The signals transmitted into the other azimuthal sectors surrounding the transmitter site are independent of one another and contain different data that is of interest to the subscribers in those other sectors. Furthermore, the antenna polarities of adjacent sectors are of opposite polarities. Therefore, the RF signals from the two sector antennas cannot combine destructively, and the subscriber antenna will receive only one of the two possible sector signals.

The current invention can be implemented either to provide only one-way wideband transmission from the provider site through the transmitter sites to the subscriber sites, or it can be implemented to provide two-way wideband transmissions between the provider site and the subscriber sites via the transmitter sites.

In the preferred embodiment, the two-way wideband transmission process would be used for video conferencing between subscribers. Consequently, the provider site would not be the final destination for the transmission from the subscribers, but it would provide switching service to interconnect the two-way transmissions among the subscribers who are participating in the video conference. Alternatively, the switching function could also be provided at each transmission tower, thereby eliminating the need to route all signals back to the provider site.

SUMMARY OF THE INVENTION

The present invention is a digitally-implemented multi-channel data distribution system and method using a sectorized RF transmission technique. The invention can be implemented as a one-way signal transmission system or as a two-way signal transmission system.

The one-way system of the present invention includes three subsystems; the provider site, the transmitter site, and the subscriber site.

Examples of channel signals that can be transmitted by the system of the present invention include analog television signals (i.e., analog audio and video signals), formatted digital television signals, teleconferencing signals, interactive programming signals, computer system data signals, and video-on-demand signals. Each of these channels may be provided to the system in a different format, depending on the information being transmitted within the channel. In some cases channels are initially pre-conditioned by the program provider of the present invention in order to facilitate subsequent processing steps. All analog signals need to be converted to a digital form and, if necessary, the digital data rate must be compressed. In one embodiment, analog television channel signals are analog-to-digital (A/D) converted and compressed using MPEG standard data compression formatting. In other embodiments, other compression techniques and formats can be used.

Once preconditioned, the channels to be transmitted into the service sector are multiplexed together to form a single stream of interleaved digital bits representing all of the channels. In the preferred embodiment, this multiplexing step is achieved by time division multiplexing. In another embodiment, multiplexing is achieved by frequency division multiplexing. The digital stream of bits is then formatted into a frame format so that the channel information within the bit stream is distinguishable when performing subsequent signal processing steps. In one embodiment of the present invention, SONET STS-3 frame formatting is utilized.

To serve each of the sectors in each of the transmitter sites, the provider site creates eight independent bitstreams for each transmitter site, assuming that the transmitter site employs eight sectors in its service area. In one embodiment of the present invention there is a one-to-one correspondence between the number of sectors and the number of independent bitstreams created by the provider site. In another embodiment, some of the sectors share the same independent bitstreams.

Once the channel signals are converted to a digital format, a single bitstream is formed by interleaving each of the channels together in a process known as time division multiplexing (TDM).

In the preferred embodiment, the time division multiplexing process is accomplished by first "packetizing" each digital channel into Asynchronous Transfer Mode (ATM) packets. Packetizing a bitstream into ATM packets or ATM cells involves dividing the bitstream into 48-byte segments and adding a 5-byte header to form a single ATM cell.

The preferred embodiment time-interleaves the ATM cells from each of the digital channel sources into a single, high data rate bitstream. In turn, this single bitstream is further formatted into Synchronous Optical NETwork (SONET) or Synchronous Digital Hierarchy (SDH) frames. The result is a signal that can be distributed from the provider site to designated transmitter sites using well known techniques such as microwave point-to-point radio systems, relay via satellite, transfer over optical fiber lines, or any other similar transmission method.

In another embodiment, the channel signals are multiplexed by frequency division multiplexing. In this type of system, each channel signal is modulated onto a different carrier frequency. The carrier frequencies are selected so that each signal is undistorted by the presence of other signals. All of the unique, modulated carriers are then summed together to form a single signal which can be distributed from the provider site to designated transmitter sites using the techniques described in the previous paragraph.

A transmitter site puts the incoming digital data streams from the provider site into condition for transmission via RF means to the subscriber sites. For each of the incoming data streams, the transmitter site modulates the bitstream onto an intermediate frequency (IF) carrier. In the preferred embodiment of the present invention, four phase modulation is used. In other embodiments of the present invention, eight-phase or frequency shift modulation may be employed. In one embodiment, the Square Root Staggered Quadriture Phase Shift Keyed (SQR-SQSPK) modulation format of the present invention is employed. The SQR-SQSPK format modulation technique is a phase modulation technique that restricts phase changes to −45°, 0°, and +45°. This phase step restriction reduces amplitude variations in the modulated signal due to large phase transitions (>45°) when changing from one logic state to another. This modulation technique is implemented by mapping the digital bitstream into an intermediate bitstream that when modulated by a standard eight phase modulation technique generates the SQR-SQSPK formatted signal of the present invention.

After modulation, each of the independent IF signals are frequency shifted (i.e., upconverted) to one of a set of predetermined radio frequencies (RF) within the pre-designated spectrum range such that adjacent transmitter sites employ different RFs to avoid interfering with one another's signal transmissions. In one embodiment, signals are upconverted to one of seven RFs. In another embodiment of the present invention, the signals are upconverted to one of four RFs. After upconversion, each of the independent RF signals are connected to the appropriate sector transmitter antenna in the present invention and radiated out to the subscriber sites in the sector service area.

In the preferred embodiment of the present invention a semiconductor RF amplifier followed by a non-linear diode frequency doubler is employed to produce the required output power and to obtain the long operating lifespans consistent with economical operation. A second embodiment of the current invention uses semiconductor RF generators and saturating amplifiers to generate adequate output power with long operating lifespans. A third embodiment of the current invention makes use of linear RF semiconductor devices for low power, short range data transmission applications. The embodiments of this invention which employ the non-linear device and the saturating amplifier device require waveforms with phase or frequency modulation that have constant amplitudes. However, the embodiment employing the linear device can make use of phase, frequency, and amplitude modulation formats. The modulation format of the embodiment of the present invention that uses a non-linear amplifiers device is the SQR-SQPSK modulation format of the present invention.

In a preferred embodiment, the antenna is a multifaced polygonal-shaped cylinder, horn or disk, where each of the faces of the cylinder constitute one distinct sector antenna. Each sector antenna transmits an independent signal into one of a plurality of wedge-shaped sectors within a given service area. In one embodiment of the present invention, an eight-faced cylinder is employed. In other embodiments, any even number of antenna faces can be used.

In a variation of the above embodiment, only a portion of the sector antennas are used. This embodiment is useful when the transmitter site is located near a large obstruction, such as a mountain, and the system does not need to transmit signals into the sectors which contain the obstruction. In this case, the likelihood of interference occurring in the other sectors due to signal reflections from the obstruction is reduced.

Subscriber sites each include an antenna for receiving the transmitted signal—each being designed to receive signals having a particular polarity. Subscriber sites also include a demodulator for demodulating the transmitted signal and a demultiplexer for interpreting and selecting one of the multiplexed channels contained in the signal received from the transmitter site. The demultiplexer is controlled by a subscriber control unit, commonly a remote channel selector device.

The selected channel provided by the demultiplexer is electrically routed to an external device depending on the information signal contained in the channel. For instance, a television channel is routed to a television, and a computer system digital data signal, such as an INTERNET signal, is routed to a computer system. In one embodiment, channels (such as television channels) that were initially A/D converted and compressed at the program provider site are reconverted back into their original forms before being routed to the final output device.

The two-way implementation of the present invention allows for two-way wide bandwidth transmissions between the provider site and the subscriber sites. The signal path from the subscriber to the provider site (referred to as the backchannel) is a wireless data link transmitted through the subscriber's antenna at a nominal carrier frequency other than the operating frequencies used for broadcasting signals from the transmitter sites to the subscriber site. The data contained in the backchannel can be Pay-Per-View request data, video images for video-conferencing or distance learning, or several other digital data streams which one may wish to use the wireless link to connect with other public or private networks.

In the case in which the two-way wide bandwidth transmission process is used for video conferencing between subscribers, the provider site is not the final destination for the transmission from the subscribers. Instead, it provides switching service to interconnect the two-way transmissions among the subscribers who are participating in the video conference.

BRIEF DESCRIPTION OF THE DRAWINGS

FIG. 1 illustrates an example of a local multichannel distribution system (LMDS) including a program provider site, a cell transmitter site, and a subscriber site.

FIG. 2 is a block diagram illustrating one embodiment of the one-way implementation of the system and method of the present invention.

FIG. 3 illustrates one embodiment of the provider subsystem of the present invention including the Video Encoder Segment of the present invention and the Signal Multiplexer Segment of the present invention.

FIG. 4A illustrates a bandlimited conventional staggered QPSK formatted signal.

FIG. 4B illustrates the bandlimited square root staggered QPSK (SQR-SQPSK) formatted signal of the present invention.

FIG. 5A shows one embodiment of an IF Modulator Segment of the present invention.

FIG. 5B illustrates a phase state look-up table used to perform the SQR-SQPSK modulation technique of the present invention.

FIG. 5C illustrates the constellation diagram corresponding to the look-up table shown in FIG. 5B.

FIG. 6 illustrates one embodiment of a RF Power Segment of the present invention which employs a non-linear saturating amplifier and diode doubler power amplifier.

FIG. 7 is a graph illustrating the manner in which RF signals are broadcast at different operating frequencies to different service areas in accordance with the method of the present invention.

FIGS. 8A–8D illustrate graphical characterizations of a conventional staggered QPSK formatted signal before and after bandlimiting and amplifying.

FIGS. 9A–9D illustrate graphical characterizations of the SQR-SQPSK formatted signal of the present invention before and after bandlimiting and amplifying.

FIG. 10A illustrates an overhead view of one embodiment of the antenna of the present invention implemented with eight antenna panels.

FIG. 10B illustrates an overhead view of one embodiment of the antenna of the present invention implemented with six antenna panels.

FIG. 11 illustrates an array of transmitting sites in accordance with the sectorized transmission method of the present invention.

FIG. 12A illustrates one implementation of the RF Demodulator Segment of the present invention.

FIG. 12B illustrates one implementation of the Settop Box Segment of the present invention.

FIG. 13 illustrates an example of spectrum allocation for the forward channel and backchannel bands in a given sector in accordance a two-way embodiment of the present invention.

DETAILED DESCRIPTION

The present invention is a digital multichannel RF transmission system and method. In the following description, numerous specific details are set forth, such as operating frequency and frequency spectra, in order to provide a thorough understanding of the present invention. It will be apparent, however, to one skilled in the art that these specific details need not be employed to practice the present invention. In other instances, well-known signal processing structures and steps have not been described in detail in order to avoid unnecessarily obscuring the present invention.

The digital multichannel transmission system of the present invention is a method and system that reduces the effective bandwidth of the broadcast signal by multiplexing selected channel signals into single digital bitstreams. Reducing the bandwidth of the broadcast signal gives program providers the flexibility to provide additional channels within the broadcast spectrum. In addition, the system and method of the present invention employs a sectorized broadcasting technique that essentially divides service areas into a plurality of sectors, each sector receiving an independent broadcast signal and adjacent sector antenna's transmitting opposite polarity signals. This broadcast technique allows for a broadcast system that can be customized to the specific needs of the subscriber within each sector. Furthermore, due to the reduction in bandwidth of the broadcast signal, each service area may be designed to broadcast at one of a set of operating frequencies within a given spectrum, thereby reducing interference between service areas.

The multichannel distribution system of the present invention includes three sub-systems as shown in FIG. 2: program provider subsystem 10, transmitter subsystem 11, and receiver subsystem 12.

Provider subsystem 10, including the Video Encoder Segment 13 and the Signal Multiplexer Segment 16, performs the steps that reduce the input channel signals 14A and 14B into sets of single independent bitstreams 19. Provider subsystem 10 receives many types of channel signals including: 1) analog signals 14A, such as analog TV signals which are often in a standard PAL or NTSC analog format and 2) digital signals 14B, such as digital TV signals, which are already formatted into a standard digital format, and other digital data signals such INTERNET data, video conferencing digital signals, etc.

Video encoder segment 13 converts all analog signals 14A into digital signals and then further converts these signals into a predetermined digital compression format. Compressing the A/D converted television signal reduces the bit rate of the digital television signal to facilitate subsequent processing. FIG. 3 illustrates one embodiment of a Video Encoder Segment in accordance with the system of the present invention. In this embodiment, MPEG Video Compression Encoders 15 are used to compress digitized PAL- or NTSC-formatted analog TV signals 14A into MPEG-compressed digital signals 14A'. However, other digital compression formats can be employed to encode analog signals 14A and analog signals 14A may be in a format other than the PAL- or NTSC-format.

It should be noted that other channel signals may be processed differently. For instance, if the provider subsystem 10 receives a digital channel signal that is already in a compressed format, then no conversion is required. As shown in FIG. 2, digital signals 14B are passed directly to signal multiplexer segment 16 without performing any conversion steps.

In FIG. 3, up to m analog video signals plus x digital bitstreams are shown as inputs into the Signal Multiplexer Segment 16. The total number of independent and unique channels consisting of analog video and digital bitstreams is n..

The Signal Multiplexer Segment 16 controls how the channel signals 14A and 14B will be multiplexed into the single output bitstream 19. Each of Signal Multiplexer Segments 16 generates an independent bitstream 19 comprising all or a portion of channel signals 14A' and 14B. Thus, each of independent bitstreams 19 shown in FIG. 2 may comprise a different set of channels. The number of bitstreams 19 is dependent on the number of antenna panels that the antenna of the present invention includes. For example in the embodiment of the present invention that employs an antenna having eight antenna panels, eight independent bitstreams 19 are generated for each transmitter subsystem 11. This allows a different signal to be coupled to and broadcast from each of eight antenna panels in a given service area.

FIG. 3 illustrates one implementation of the Signal Multiplex Segment 16 of the present invention. In this implementation, Signal Multiplexer Segment 16 processes each of the digital datastream channel signals (n channels total) from the various sources through an Error Correction Encoder 17A. The number of digital datastream channels (n) is an implementation choice dependent upon the type and bit rate of the datastreams to be supported and the quality of service required by each channel. The Error Correction Encoder 17A allows each channel to be individually optimized for error detection/correction performance while operating within the system. Signals requiring very high fidelity and low Bit Error Rates (BER), such as MPEG-encoded digital video signals, are encoded with higher performance (and greater overhead) error correction codes than signals which do not require the same BER performance for acceptable operation.

Following the Error Correction Encoder 17A is the Timebase Corrector 17B. The Timebase Corrector 17B synchronizes each channel signal's bit rate to a common clock source. Thus, all samples will be referenced to a single clock at the provider subsystem 10.

Time division multiplexer 18 (FIG. 3) interleaves channel signals #1 through #n into a single high speed bitstream 19. In one embodiment, each channel signal is first packetized into an Asynchronous Transfer Mode (ATM) packet (or ATM "cell"). The packetizing process collects the channel datastream into 48-byte segments (each byte equals 8-bits) and adds an additional 5-bytes of header information. This is called an ATM packet or ATM cell. The ATM cells for a specific channel are then interleaved together with other channel ATM cells and with "framing" information. Framing information consists of a repetitive interleave pattern and additional information within a specific time sequence (also referred to as a frame). This additional formatting is necessary in order to ensure that each of selected channel signals #1 through #n multiplexed within bitstream 19 is distinguishable within the bitstream. The formatting step performed by multiplexer 18 inserts additional control, error and timing information bits to generate formatted bit stream signal 19. The additional formatting bits primarily function to indicate the start of the bit frame and to keep track of the location of channel signals #1 through #n within the bit frame so that these signals remain identifiable in subsequent processing steps. In one embodiment of the present invention, SONET STS-3c bit frame formatting is performed by multiplexer 18. However, it is to be understood that any similar formatting technique can be employed.

The advantage of the present invention as compared to the prior art transmission systems is that the prior art transmits modulated channels in parallel—each channel using a portion of the allotted LMDS spectrum. In contrast, the present invention multiplexes selected channels into a single bitstream 19 which is then digitally modulated with a bandwidth-efficient modulation technique which reduces the effective bandwidth of the broadcast signals. For instance, one prior art transmission system uses up to 1 GHz of the LMDS spectrum to transmit up to 50 channels (each approximately 20 MHz wide) by transmitting modulated analog signals in parallel. The present invention, on the other hand, multiplexes up to 81 television channels into a single bitstream broadcast single having a bandwidth that is approximately equal to 80 MHz thereby using a significantly smaller portion of the LMDS spectrum than the prior art method. One advantage of this reduced spectrum usage is that the present invention is able to fit more channels within the LMDS spectrum than the prior art method. Thus, where prior art methods might have to give up a portion of 50 channels to make room in the spectrum for other channel types, such as an INTERNET channel, the present invention can fit the standard channels and still have enough spectrum left to provide for other channel types.

In order to transmit bitstreams 19 the signals must be put in suitable condition in accordance with the transmission method used to transmit the bitstream(s) between provider subsystem 10 and transmitter subsystem 11. Several different point-to-point digital transmission methodologies can be used such as satellite, cable, point-to-point microwave transmission, or fiber optics. The particular processing steps performed to put the bitstream(s) in condition for transmission is dependent on the transmission methodology used and should be well understood by one skilled in the field of communication systems.

Transmitter subsystem 11 connects an IF Modulator Segment 20 to each of independent and unique bitstreams 19 and generates a modulated signal centered at an intermediate frequency (IF). RF Power Segments 21 frequency shifts the modulated signals from the IF frequency to the final broadcast operating frequency and provides the necessary amplification for wireless transmission to the receiver subsystem.

Modulator Segment 20 and Power Segment 21 (FIG. 2) can be implemented in many different manners. For instance, in a first embodiment of the present invention bitstreams 19 are modulated into either an amplitude, phase, or frequency formatted signal at an intermediate frequency (IF) less than the broadcast radio frequency, translated in frequency to the final broadcast operating frequency, and then amplified with linear power amplifiers adjusted to operate at the final broadcast frequency. In this embodiment, it is necessary to use linear amplifiers since a non-linear amplifier does not produce the desired modulated signal when amplifying a modulated signal having amplitude variations (such as an AM signal). Currently, linear power amplifiers manufactured to amplify relatively high radio frequency signals are considered to be an expensive but unavoidable device implementation choice. Consequently, although this embodiment is able to produce a broadcast signal having the desired modulation and power characteristics, the overall cost of a system implemented in this manner is greatly increased due to the necessity of using linear amplifiers.

In a second embodiment of the present invention, bitstreams 19 are modulated using a constant amplitude modulation format (i.e. either phase or frequency modulation), mixed to the broadcast RF and then amplified using conventional non-linear amplifiers. Although this embodiment provides the desired modulated signals, and avoids employing linear amplifiers, some inaccuracies may occur when amplifying the phase or frequency modulated signals with the non-linear amplifier. Specifically, although phase and frequency modulation does not use amplitude variations to encode logic state changes, amplitude variations still do occur when changing logic states. Non-linear amplifiers do not tolerate amplitude variations and as a result, may provide erroneous output signals due to these amplitude variations. Furthermore, currently available high frequency non-linear amplifiers on the market tend to provide a limited amount of power thereby minimizing the available broadcasting power.

In a third embodiment of the present invention, bitstreams 19 are phase modulated into the Square Root Staggered Quadrature Phase Shift Keyed (SQR-SQPSK) modulation format according to the present invention. The SQR-SQPSK format of the present invention is obtained by performing a standard 8-phase modulation with the added restriction that phase changes of only +45°, 0°, and −45° can occur at each clock period so that amplitude variations are reduced (compared to a conventional staggered QPSK (SQPSK) signal) when transitioning from one logic state to another. The SQR-SQPSK format is also characterized such that when amplified by a doubler power amplifier it generates a conventional SQPSK signal; (it should be well known in the field of communication system design that a doubler power amplifier functions to double the frequency excursion or the phase excursion of a signal).

The SQR-SQPSK is a modulation format that is specifically designed to generate a signal that is to be amplified with a non-linear saturating amplifier or an amplifier with a doubler. These amplifiers provide adequate power using solid state devices. Furthermore, due to the SQR-SQPSK modulated signal's constant amplitude, it is ideal for saturating and non-linear amplifiers because amplitude variations produce distortion in the output signal.

FIGS. 4A and 4B illustrate the amplitude time histories of a conventional bandlimited staggered QPSK signal and the SQR-SQPSK formatted signal of the present invention, respectively—each being generated by modulating the same input signal. As can be seen, the conventional SQPSK signal has much larger amplitude variations vs. time compared to the SQR-SQPSK formatted signal of the present invention. Hence, amplitude variations are reduced in this phase modulation technique such that a saturating non-linear amplifier can be effectively employed.

In the embodiment of the system and method of the present invention using the SQR-SQPSK modulation format, bitstreams 19 are first modulated into SQR-SQPSK formatted signals onto a first IF carrier. The modulated signals are then mixed to a second IF (equal to half the desired broadcast RF) and amplified with a non-linear amplifier tuned to the second IF frequency. Finally, the amplified signals are frequency doubled to the desired broadcast RF by a doubler power amplifier to obtain conventional staggered QPSK signals at the desired broadcast RF.

This embodiment of the present invention is superior and more economical than prior art embodiments that use high frequency linear and non-linear amplification techniques since the present invention's technique initially amplifies at a lower IF frequency (i.e. half the broadcast frequency) using a non-linear amplifier and then doubles the frequency using a doubling power amplifier. By amplifying a SQR-SQPSK formatted signal with a non-linear power amplifier tuned to a lower frequency and then amplifying again with a doubler power amplifier, the transmitter subsystem 11 of the present invention can be implemented more economically than prior art transmitter subsystems.

FIG. 5A shows one embodiment of an IF Modulator Segment used to generate a modulated signal having the SQR-SQPSK format of the present invention. Each IF Modulator Segment 20 receives one of the independent bitstreams 19. The data and clock recovery unit 22 derives the original signal 19 and an associated clock signal which is used in subsequent modulation processing steps. Bitstream signal 19 and its associated derived clock signal are connected to a Serial-to-Parallel Converter 23. The Serial-to-Parallel Converter 23 formats the serial data into two-bit words, which represent the Present Phase State 24A of the present data word. The Present Phase State 24A combined with the Past Phase State 24B generate an address into the Phase State Lookup Table 25. The output from the Phase State Lookup Table 25 is a three-bit Phase Data Word 26. Two clock outputs are also generated in the Phase State Lookup Table 25. One clock is a divide-by-2 version of the clock input into the Phase State Lookup Table 25 (denoted as CLK/2) and the second clock is an inverted version of the divide-by-2 clock (denoted as CLK/2').

The three-bit Phase Data Word 26 is routed to an I Lookup Table 27, a Q Lookup Table, and a delay element. The delay element routes the Phase Data Word 26 output back into the input as the Past Phase State 24B.

One embodiment of the present invention uses an eight phase modulation technique to generate the SQR-SQPSK signal. A constellation diagram showing the possible phase states in shown in FIG. 5B, and the Phase State Lookup Table 25 is shown in FIG. 5C. In the diagram, each possible three-bit output word from the Phase State Lookup Table is mapped into a corresponding point in the constellation. Note that Phase State Lookup Table 25 restricts phase changes to +45°, 0°, and −45° from one logic state to another.

The I Lookup Table 27 translates the 3-bit phase data into a corresponding digital word suitable for the I-data Digital-to-Analog Converter 28. The Q Lookup Table functions in the same manner for the Q-data Digital-to-Analog Converter.

The output from the I-channel and Q-channel Digital-to-Analog Converters are routed to Shaping Filters 29. The outputs for the Shaping Filter 29 are connected to the Quadrature Modulator 30A, where the baseband analog data is modulated at carrier frequency supplied by the 1st LO Source 30B. The output from the Quadrature Modulator 30A is the Modulated IF Signal 31.

FIG. 6 show one embodiment of the RF Power Segment (21). The IF Modulated Signal 31 is filtered by Bandpass Filter 32 to filter out signals at frequencies other than the modulation carrier frequency. Next the filtered signal is amplified by Amplifier 33, and then frequency shifted by Mixer 34 to one of a set of operating frequencies. The 2nd LO Source 35 is the frequency source that determines the final carrier frequency out of the RF Power Segment 21.

All sectors within a given service area are broadcast at the same operating frequency and adjacent transmitter subsystems broadcast at different operating frequencies. In this way subscribers in a first service area do not experience interference from signals that are being broadcast in surrounding service areas. The different operating frequencies between different transmitter subsystem broadcast areas are determined by selecting a different 2nd LO Source 35 center frequency setting.

An example of how signals for each service area are frequency shifted is shown in FIG. 7. In this example, the n modulated signals being broadcast into four different service areas are shifted to one of four operating frequencies, F(1)–F(4). This corresponds to one of four different center frequency settings for 2nd LO Source 35.

As shown in FIG. 7, each of the subscribers in service areas 1–4 would receive n modulated signals, but each service area transmitter broadcasts the n modulated signals at a different operating frequency. As a result, adjacent service area interference is significantly reduced.

In one embodiment of the present invention, operating frequencies F(1)–F(4) are spaced 130 MHz apart and each of the n modulated signals are spaced with a 10 MHz "guard band" between each band to ensure minimal adjacent cell interference (note: this embodiment assumes that each of the bands of n modulated signals occupies a spectrum of approximately 120 MHz wide). In another implementation, the band of n signals are shifted to one of seven operating frequencies.

The output from Mixer 34 of FIG. 6 is bandlimited by Bandpass Filter 36 to remove undesired frequency components introduced by the frequency shifting process of the mixer. The frequency of the output of the Bandpass Filter 36 is one-half of the final broadcast operating frequency. Driver Amplifier 37 is a saturating, non-linear amplifier adjusted to amplify signals in a frequency range that is one-half of the final broadcast operating frequency. Implementation savings are realized by decreasing the frequency range of the Driver Amplifier 37 to operate at one-half of the final broadcast operating frequency.

As described previously, due to the restricted amplitude variation of a signal that is modulated into the SQR-SQSPK format of the present invention, a saturating non-linear amplifier can be used to reliably amplify the SQR-SQSPK modulated signal. Additional implementation savings are realized because the SQR-SQPSK modulation technique does not require a linear driver amplifier be used to maintain amplitude characteristics of the modulated system.

After amplification, the frequency of the SQR-SQPSK modulated signal is doubled by Power Amplifier/Doubler 38. Power Amplifier/Doubler 38 is a diode doubler power amplifier which functions to double the frequency of its input signal. As described above, the SQR-SQPSK signal is designed so that when amplified by a diode doubler power amplifier, the resulting signal is a conventional SQPSK signal. Thus, output signal 39 of Power Amplifier/Doubler 38 is a signal having a frequency equal to the desired broadcast operating frequency and having a conventional SQPSK modulation format.

One aspect of the present invention that should be noted is that the SQR-SQPSK modulated signal is bandlimited in frequency by Bandpass Filter 36 before being amplified by the Power Amplifier/Doubler 38 and this bandlimiting is preserved at the output of Power Amplifier/Doubler 38. In contrast, prior art methods using conventional QPSK modulation and non-linear amplification techniques requires bandlimiting before and after the amplification step due to the non-linear amplifier's intolerance to amplitude variations occurring in a QPSK-formatted signal. The ability of the present invention to only bandlimit once before the amplification stage allows for a more efficient usage of power, since an additional bandlimiting step after amplification that reduces the effective transmitted power of conventional QPSK-formatted signals can be omitted..

FIGS. 8A–D and 9A–D are graphs illustrating bandlimiting and amplification advantages of the SQR-SQSPK modulation technique of the present invention (FIGS. 9A–D) over the prior art conventional QPSK modulation technique (FIGS. 8A–D). FIGS. 8A and 9A illustrate the power spectrum of a QPSK and SQR-SQSPK formatted signal, respectively, before bandlimiting and amplifying with a power amplifier, FIGS. 8B and 9B illustrate the power spectrum of the QPSK and SQR-SQSPK formatted signals, respectively, after bandlimiting and amplification by a doubler power amplifier, FIGS. 8C and 9C illustrate the amplitude vs. time of the QPSK and SQR-SQSPK formatted signals, respectively, after bandlimiting, and FIGS. 8D and 9D illustrate the polar plot of these signals after bandlimiting. In comparison, it can be seen that the SQR-SQPSK signal exhibits smaller amplitude variations in FIGS. 9C and 9D and a narrower power spectrum in FIG. 9B compared to the amplitude variations and power spectrum of the conventional QPSK signal as illustrated in FIGS. 8B, 8C, and 8D. FIG. 9C also illustrates that the SQR-SQPSK signal of the present invention does not require additional bandlimiting after the amplification performed by the doubler power amplifier, whereas FIG. 8C illustrates that the conventional staggered QPSK signal could require an additional bandlimiting step.

After modulation and amplification these signals are broadcast to subscribers by antennas located in each service area. Pairs of IF Modulator Segments 20 and RF Power Segments 21 each generate one modulated and amplified signal 39 within each service area. Each set of signals 39 are coupled to the antenna of the present invention comprising independent sector antenna panels. It should be understood that in one embodiment the number of signals 39 generated is equal to the same number of antenna panels such that each antenna panel broadcasts an independent signal. In another embodiment, some of the panels may broadcast the same signal.

One embodiment of the antenna of the present invention is a multifaced polygonal shaped cylinder where each of the faces of the cylinder constitute one distinct sector antenna panel. FIG. 10A illustrates a top view of one embodiment of antenna 42 of the present invention having eight sector antenna panels 43. Sector antenna panels in this embodiment produce a beamwidth 45° in azimuth. In an alternate embodiment, antenna 42 comprises a six-sided polygonal where each face produces a beamwidth of 60° in azimuth (FIG. 10B).

It should be noted that the RF of each sector signal is identical to the RF of the other sector signals radiated from each transmitter site antenna. Because each sector antenna is physically separated from the other sector antennas, these sector antennas tend to operate as phased arrays when they transmit signals. The theory of phased array antenna systems predicts that the signals emitted by the individual array antennas will destructively combine with one another at certain pointing angles from the phased array. Consequently, there will be directions extending outward from the phased array along which no signal energy can be received. In the present invention, the most vulnerable locations for these destructive interference zones are found along the azimuthal boundaries of the wedge-shaped sectors (indicated by 44, FIG. 10). Thus to prevent this destructive interference between sector signals at subscriber locations along the boundaries of the azimuthal sectors, the antenna polarities of adjacent sectors are of opposite polarities. Therefore, the RF signals from the two sector antennas cannot combine destructively, and the subscriber antenna will receive only one of the two possible sector signals thereby preventing destructive interference from occurring along the azimuth lines extending out from the transmitter antenna where the 45° or 60° wide beams overlap.

The use of independent polarizations for the adjacent sector antennas in the present invention differs from the prior art in that the prior art uses differing antenna polarizations to prevent unwanted and unrelated signals from entering the receiver antenna. In the current invention, however, differing polarizations are used to prevent similar signals from canceling one another as they impinge simultaneously upon the receiver antenna.

FIG. 11 illustrates an array of service areas 45 resulting from the sectorized transmission method of the present invention employing an octagonal antenna configuration. As shown, transmitter sites 46 reside in the center of each of the service areas 45. Each service area, as described above, broadcasts at one of a set of operating frequencies thereby reducing destructive interference between adjacent service areas. In addition, each service area is sectorized, such that adjacent sectors broadcast opposite polarity signals as shown in FIG. 10. Consequently, the present invention not only reduces interference along service area boundaries, but also reduces interference along sector boundaries within the service area.

It should be noted that the multifaced antenna of the present invention also holds the advantage of potential power and implementation savings. In particular, if antenna panels are facing large obstructions (i.e. mountains) such that it is not necessary or desired to broadcast a signal in that direction, the modulator/amplifier/antenna panel(s) facing in the direction of the obstruction can be disabled or eliminated altogether. Thus, the sectorized antenna can be customized to meet the physical broadcast requirements of the area while reducing power consumption and implementation cost.

Receiver subsystem 12, shown in FIG. 2, includes a RF Demodulator Segment 47 and a Settop Box Segment 49. The RF Demodulator Segment 47 receives a broadcast signal 41 with the particular polarity that the receiving antenna is designed to accept. The RF Demodulator Segment 47 demodulates the broadcast signal 41 to recover the underlying digital datastream. The Demodulator Segment 41 selects one of the channels encoded in the recovered bitstream in response to a control signal provided by the subscriber. This control signal from the Settop Box Segment 49 is the Channel Select Control 64 and is selected by the user through a remote control device or other input device. The selected digital signal channel 48 is sent to the Settop Box Segment 49 which decodes the selected channel 48 and puts it into a format suitable for the I/O device that it is connected to.

For instance, if the settop box is connected to an analog television set, the settop box first decompresses the digital video signal and then converts the digital datastream back into an analog television signal which can be displayed by the analog television set.

FIG. 12A illustrates one implementation of RF Demodulator Segment 47 of the present invention and FIG. 12B illustrates the embodiment of the Settop Box Segment 49 of the present invention, however it should be understood that the system and method of the present invention is not limited to these implementations.

Referring to FIG. 12A, Antenna 50 receives one of broadcast signals 41 (FIG. 2) from Transmitter Subsystem 11. Signal 41 is filtered by a Bandpass Filter 51 to limit the amount of received signal energy to the desired frequency bandwidth. The Low Noise Amplifier (LNA) is an amplifier designed to boost the received signal without adding significantly to the level of noise in the signal. The output of the LNA and Bandpass Filter 51 is connected to a Mixer 52, which translates the center frequency of the received signal to an Intermediate Frequency (IF). Signal 53 is then passed through the IF Bandpass Filter 54, which is designed to pass the desired frequency band centered at the IF frequency and reject any other frequency signals.

The demodulator portion of FIG. 12A demodulates the output signal 55 of IF Bandpass Filter 54. The particular demodulator implementation shown is a SQPSK demodulator having in-phase component I and a quadrature-phase component Q modulation paths. The I demodulation path includes Mixer 56 and Threshold Detector 57. The Q demodulation path includes Mixer 58 and Threshold Detector 59. The demodulator uses a feedback path which includes the Carrier Tracking Circuitry 60 to optimize the demodulator output. The output of the Carrier Tracking Circuitry 60 controls the frequency of the 2nd Lo. The output from Mixers 56 and 58 are two analog baseband datastreams. These signals are then processed through Threshold Detectors 57 and 59, respectively. The threshold detectors convert the two analog baseband datastreams into binary datastreams which are input into the Digital Datastream Recovery Unity 61. The binary datastreams are labeled 'I' and 'Q' in FIG. 12A, corresponding to an In-phase (I) and Quadrature-phase (Q) component.

Digital Datastream Recovery Unit 61 recovers a clock signal equal to the original transmitted symbol clock rate. It is well known in the art of communications design that in order to accurately ascertain the original information signal from a transmitted modulated signal it is necessary to obtain a symbol clock signal that is equal to the transmitted symbol rate.

Within the Digital Datastream Recovery Unit 61, the I and Q inputs are resampled to be aligned with the recovered clock signal and combined to form a single high-speed bitstream. In order to obtain the data associated with an individual channel, the signal must be demultiplexed. The demultiplexing process reverses the procedure depicted in the Time Division Multiplexer 18 of FIG. 3. The high-speed bitstream output 19 from the Time Division Multiplexer 18 of FIG. 3 consists of many independent channels. De-multiplexing describes a procedure that allows one of the independent channels present in the high-speed bitstream output 19 to be separated from the high-speed bitstream for subsequent processing. The output of the Digital Datastream Recovery Unit 61 is Clock 61 and Data 48 signals that are routed to the Settop Box Segment 49.

In the implementation shown in FIG. 12B, the Settop Box Segment 49 is adapted for processing only television channel signals. Thus, it should be understood that similar settop box designs can be adapted to process other types of channel information such as digital data for computer systems, video conferencing data, etc. Referring to FIG. 12B, the selected channel data 48 from RF Demodulator Segment 47 is routed to a television settop box. The settop box includes Receiver 65, Video Compression Decoder 66, Analog Video Converter, Analog Audio Converter 67, Remote Control 68, IR Receiver 69, Settop Host Controller 70, and RS-422 Transmitter 71. RS-422 Receiver 65 receives the signal from RF Demodulator Segment 47 and connects it to Video Compression Decoder 66. The Video Compression Decoder 66 decompresses the digital, audio, and video signal into the corresponding separate audio and video portions of the selected channel signal. The decompressed audio and video digital television signals are then each reconverted into analog audio and video television signals by Converters 67 and then coupled to the television set. A Remote Control Device 68 provides channel select control signals via IR signals to the television set and also to the settop box to indicate the selected channel. IR Receiver 69 receives the channel select control signals and transmits these to Demodulator Segment 47 through Settop Host Controller 70 and Receiver 71.

Due to the efficient spectrum usage of the present invention the system of the present invention is particularly adaptable to a two-way transmission implementation which includes a wireless signal path from the receiver subsystem 12 to the transmitter subsystem 11, (commonly referred to as the backchannel). Backchannel signals are transmitted at a nominal carrier frequency that is approximately the same as the forward channel RF broadcast frequency. The data contained in the backchannel can be Pay-Per-View request data, video data images for video-conferencing, distance learning programs, or other types of digital data streams. These backchannel signals may be in digital or analog format.

In one embodiment of the present invention the backchannel signal is formatted into a hybrid FDM/TDMA (frequency division multiplex/time division multiple access) formatted signal. Data is sent from the subscriber in segments—each segment being assigned to a specific subscriber. The segments are assigned a frequency channel and a time slot for transmission within that frequency channel. These assignments are unique to the subscriber and insure that the subscriber will be the only user of that frequency channel and time-slot pair while the subscriber requires the use of the backchannel link.

Time slots are allocated dynamically to the subscribers on a demand basis. Multiple slots may be allocated to a single subscriber to increase the backchannel data rate for a particular subscriber. The modulation format of the backchannel is the same format as forward channel signal. In one embodiment of the present invention, the modulation rate of each of the backchannel FDM carriers is 2.048 Mbps, and the frequency bandwidth occupied by each FDM carrier is approximately 2 MHz. Further to this embodiment, data is sent from the subscriber in 64-kbps$^2$ segments and each FDM carrier contains thirty-two 64-kbps TDMA slots.

The back channel carrier frequency is transmitted at a carrier frequency sufficiently separated from the forward channel broadcast frequency to prevent mutual interference between the forward channel transmission and the backchannel transmission. FIG. 13 illustrates an example of spectrum allocation for the forward and backchannel bands for a given sector in the case where 480 MHz of spectrum is available. As shown, 160 MHz is allocated for the forward channel which, as described above in the one-way implementation of the present invention, is enough to accommodate the standard 96 channels. Assuming a guard band of 20 MHz between the forward channel and backchannel, 300 MHz remains for backchannel use. As a result, there could exist 150 FDM carriers (i.e. 300 MHz/2 MHz bandwidth per FDM carrier) available for the backchannel of a given sector (assuming 2 MHz per FDM carrier). In the case in which thirty-two 64 kbps TDMA time slots are present on each FDM carrier, 4,800 (i.e. 32 slots×150 carriers) individual data links per sector can potentially be supported.

In this embodiment, a single FDM carrier can be reserved for use as the control channel for requesting backchannel frequency channels and time slot assignments. The subscriber equipment can initiate a request for a backchannel by sending a packet to the transmitter subsystem 11 in one of the control channel time slots. The transmitter subsystem 11 receives this information and sends a frequency channel and time slot assignment to the subscriber. This information from the transmitter subsystem 11 is sent in an ATM cell broadcast to all subscribers within that base station's sector.

The backchannel takes advantage of the inherent synchronization of all subscribers to a clock rate originating from the same source (i.e. transmitter subsystem 11). This allows for a very accurate time synchronization capability at each subscriber unit. Simple commands sent in the forward channel can be used to correct for differences in the time of arrival of backchannel signals received at the transmitter subsystem 11. These differences in time of arrival are caused by the variations in propagation path distances from each of the subscribers to the given transmitter subsystem site.

It should be understood that the physical implementation of a two-way transmission embodiment of the present invention includes subscriber site circuitry for formatting the backchannel signals into the hybrid FDM/TDMA format as well as circuitry for placing the formatted backchannel signals into condition for wireless transmission to transmitter subsystem 11 such as modulation circuitry for modulating the formatted backchannel signals onto an RF carrier signal. Furthermore, the transmitter subsystem 11 in the two-way implementation of the present invention includes an antenna for receiving backchannel signals within the transmitter subsystem's service area. The back channels, once received at the transmitter subsystem site, are either transmitted to other subscribers in the service area or back to the provider subsystem depending on the type of backchannel data being transmitted. For instance, in the case of video-conferencing data the transmitter subsystem includes a switching network for routing video-conferencing data between two subscriber sites. In the case in which back channel data is a Pay-Per-View request control signal, transmitter 11 transmits this data back to the provider subsystem 10.

Although the elements of the present invention have been described in conjunction with certain embodiments, it is appreciated that the invention can be implemented in a variety of other ways. Consequently, it is to be understood that the particular embodiments shown and described by way of illustration are in no way intended to be considered limiting. Reference to the details of these embodiments is not intended to limit the scope of the claims which themselves recite only those features regarded as essential to the invention.

We claim:

1. In a wireless transmission system including a provider subsystem for providing a plurality of channels of signals, a transmission subsystem for transmitting channels of modulated signals in a wireless manner to a plurality of service areas, and a receiving subsystem for receiving said modulated channel signals, said transmission system comprising:

a means for generating from said plurality of channels a plurality of continuous modulated signals which are independent of each other, each of said independent signals representing a selectable combination of said plurality of channels, and for providing said plurality of independent signals to each of a plurality of antennas;

each of said antennas including a plurality of individual antenna sections, wherein each of said antenna sections transmits one of said independent signals whereby said independent signals are sectorially transmitted from said each antenna.

2. The transmission system as described in claim 1 wherein each of said independent signals represents different selectable combinations of said plurality of channels of signals.

3. The transmission system as described in claim 1 wherein at least two of said independent signals represent the same selectable combinations of said plurality of channels of signals.

4. The transmission system as described in claims 2 or 3 wherein said individual antenna sections are arranged in a multifaced polygonal cylindrical configuration.

5. The transmission system as described in claim 4 wherein said each antenna section has an associated transmission polarity and adjacent antenna sections have opposite associated transmission polarities.

6. The transmission system as described in claim 5 wherein said multifaced polygonal cylindrical configuration includes six of said antenna sections and wherein said each section transmits a 60° azimuth of said one of said modulated signals.

7. The transmission system as described in claim 5 wherein said multifaced polygonal cylindrical configuration includes eight of said antenna sections and wherein said each section transmits a 45° azimuth of said one of said modulated signals.

8. The transmission system as described in claim 7 wherein said antenna sections are horn-type antennas.

9. The transmission system as described in claim 7 wherein said antenna sections are dish-type antennas.

10. In a wireless transmission system including a provider subsystem for providing a plurality of channels of signals, a transmission subsystem including a plurality of antennas for transmitting channels of modulated signals in a wireless manner to a plurality of service areas, and a receiving subsystem for receiving said modulated channel signals, each of said antennas having an associated service area, a method comprising the steps of:

generating from said plurality of channels a plurality of continuous modulated signals which are independent of each other, each of said independent signals representing a selectable combination of said plurality of channels, and for providing said plurality of independent signals to each of a plurality of antennas;

providing said plurality of independent signals to each of a plurality of transmitting means, wherein each transmitting means has an associated service area;

transmitting said independent signals to each service area associated with said each transmitting means wherein said each service area is divided into sectors and each of said independent signals is transmitted to one corresponding sector.

11. The method as described in claim 10 wherein each of said independent signals represents different selectable combinations of said plurality of channels of signals.

12. The method as described in claim 10 wherein at least two of said independent signals represent the same selectable combinations of said plurality of channels of signals.

13. The method as described in claims 11 or 12 wherein said plurality of independent signals are transmitted such that adjacent sectors receive opposite polarity signals.

14. The method as described in claim 13 wherein each of said plurality of independent signals is a 60° azimuth signal.

15. The method as described in claim 13 wherein each of said plurality of independent signals is a 45° azimuth signal.

16. A wireless transmission system comprising:

a provider subsystem for converting a plurality of channels of signals into a plurality of formatted independent digital datastreams, each of said formatted digital datastreams representing a selectable combination of said plurality of channels;

a transmitter subsystem including a plurality of transmitter means each having an associated service area, said each transmitter means modulating each of said formatted digital datastreams into a corresponding modulated signal so as to generate a plurality of continuous modulated signals which are independent of each other, said each service area being divided into a plurality of sectors and said each transmitter means transmitting each of said independent signals to one corresponding sector within its associated service area;

a receiver subsystem including a plurality of receiver means in each sector within each service area for converting one of said independent signals into its corresponding formatted digital datastream and selecting one channel of signals of said portion of plurality of channels from said corresponding formatted digital datastream.

17. The transmission system as described in claim 16 wherein each of said independent formatted digital datastreams represents different selectable combinations of said plurality of channels of signals.

18. The transmission system as described in claim 16 wherein at least two of said independent formatted digital datastreams represent the same selectable combinations of said plurality of channels of signals.

19. The transmission system as described in claim 17 or 18 wherein said provider subsystem comprises a plurality of means for generating said each formatted digital datastream, each of said means for generating each of said digital datastreams including means for encoding said plurality of channels into a plurality of intermediate digital datastreams and means for formatting and multiplexing said plurality of intermediate digital datastreams into said each formatted digital datastream.

20. The transmission system as described in claim 19 wherein said means for formatting and multiplexing formats said formatted digital datastreams into a single ATM formatted digital datastream.

21. The system as described in claim 20 wherein said each transmitter means transmits said modulated signals at one of a set of operating frequencies.

22. The system as described in claim 21 wherein said plurality of channels of signals includes previously compressed digital television signals.

23. The system as described in claim 22 wherein said plurality of channels of signals also includes digital computer system signals.

24. The system as described in claim 23 wherein said encoding means formats said intermediate digital datastreams according to SONET SDH formatting.

25. The system as described in claim 24 wherein said formatting and multiplexing means performs frequency division multiplexing.

26. The system as described in claim 25 wherein said means for encoding comprises an analog-to-digital converter and a means for compressing digital signals.

27. The system as described in claim 26 wherein said means for compressing uses an MPEG compression format.

28. The system as described in claim 27 wherein said each transmitter means includes an antenna for transmitting said independent modulated signals, each antenna having a plurality of individual antenna sections for transmitting one of said independent signals and each section having an associated transmission polarity, wherein adjacent antenna sections have opposite associated transmission polarities.

29. The system as described in claim 28 wherein said individual antenna sections are arranged in a multifaced polygonal cylindrical configuration.

30. The system as described in claim 29 wherein said each receiver means further includes means for transmitting RF signals and said each transmitter means further includes means for receiving said RF signals from said receiver means so as to enable two-way transmission between said transmitter subsystem and said receiver subsystem.

31. In a wireless transmission system, a method for transmitting and receiving signals comprising the steps of:

converting a plurality of channels of signals into a plurality of formatted digital datastreams, each of said formatted digital datastreams representing a selectable combination of said plurality of channels;

modulating each of said formatted digital datastreams to generate a corresponding modulated signal thereby generating a plurality of continuous modulated signals which are independent of each other;

providing said plurality of independent signals to each of a plurality of transmitting means, wherein each transmitting means has an associated service area;

transmitting said independent signals to each service area associated with said each transmitting means, wherein said each service area is divided into a plurality of sectors and each sector receives one of said independent signals;

receiving said one independent signal; and converting said one independent signal into a signal usable by a given I/O device.

32. The method as described in claim 31 wherein each of said independent formatted digital datastreams represents different selectable combinations of said plurality of channels of signals.

33. The method as described in claim 31 wherein at least two of said independent formatted digital datastreams represent the same selectable combinations of said plurality of channels of signals.

34. The method as described in claim 32 or 33 wherein said step of converting a plurality of channels of signals into a plurality of independent formatted digital datastreams, further comprises the step of encoding said portion of said channels into an intermediate digital datastream and the step of multiplexing and formatting said intermediate digital datastream into said each formatted digital datastream.

35. The method as described in claim 34 further including the step of formatting said plurality of formatted digital datastreams into a single formatted digital datastream representing said plurality of formatted digital datastreams, wherein said single digital datastream is reconstructed into said plurality of formatted digital datastreams prior to said modulation step.

36. The method as described in claim 35 wherein said independent modulated signals are transmitted at one of a set of operating frequencies.

37. The method as described in claim 36 wherein said each independent datastream is modulated into a square root staggered QPSK (SQR-SQPSK) formatted modulated signal.

38. The method as described in claim 37 further including the steps of amplifying said modulated signal with an amplifier and a doubler power amplifier to generate a staggered QPSK modulated signal before the step of transmitting said modulated signals to said service area.

* * * * *